(12) United States Patent
Seki et al.

(10) Patent No.: US 11,637,281 B2
(45) Date of Patent: Apr. 25, 2023

(54) SECONDARY BATTERY, BATTERY PACK, VEHICLE, AND STATIONARY POWER SUPPLY

(71) Applicant: KABUSHIKI KAISHA TOSHIBA, Tokyo (JP)

(72) Inventors: Hayato Seki, Kawasaki Kanagawa (JP); Wataru Uno, Yokohama Kanagawa (JP); Takashi Kuboki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 111 days.

(21) Appl. No.: 17/181,622

(22) Filed: Feb. 22, 2021

(65) Prior Publication Data

US 2022/0085364 A1    Mar. 17, 2022

(30) Foreign Application Priority Data

Sep. 16, 2020 (JP) .............................. JP2020-155315

(51) Int. Cl.
*H01M 4/485* (2010.01)
*H01M 10/0563* (2010.01)
(Continued)

(52) U.S. Cl.
CPC ....... *H01M 4/485* (2013.01); *H01M 10/0563* (2013.01); *H01M 10/44* (2013.01); *H01M 2004/027* (2013.01); *H01M 2220/10* (2013.01); *H01M 2220/20* (2013.01); *H01M 2300/0014* (2013.01)

(58) Field of Classification Search
CPC .. H01M 10/0563; H01M 10/36; H01M 10/44; H01M 2004/027; H01M 2220/10; H01M 2220/20; H01M 2300/0002; H01M 2300/0014; H01M 4/485; Y02E 60/10
See application file for complete search history.

(56) References Cited

U.S. PATENT DOCUMENTS

| 6,120,938 A  * | 9/2000 | Atsumi ................ C01G 23/003 |
| | | 429/231.1 |
| 10,720,667 B2 | 7/2020 | Takami et al. |
| (Continued) | | |

FOREIGN PATENT DOCUMENTS

| JP | WO2015-111694 A1 | 7/2015 |
| JP | 2018-160342 A | 10/2018 |
| (Continued) | | |

OTHER PUBLICATIONS

Simon, D.R., et al., "Characterization of proton exchanged $Li_4Ti_5$—$O_{12}$ spinel material," ScienceDirect, Solid State Ionics, vol. 177, pp. 2759-2768 (2006).

*Primary Examiner* — Victoria H Lynch
(74) *Attorney, Agent, or Firm* — Finnegan, Henderson, Farabow, Garrett & Dunner, LLP

(57) ABSTRACT

According to one embodiment, a secondary battery (100) including a positive electrode (5), a negative electrode (3), a first electrolyte (9), and a second electrolyte (8). The negative electrode (3) includes a lithium titanium oxide having a degree of proton substitution of 0.01 to 0.2. The first electrolyte (9) includes water and in contact with the positive electrode (5). The second electrolyte (8) includes water and in contact with the negative electrode (3).

14 Claims, 10 Drawing Sheets

(51) Int. Cl.
    *H01M 10/44*    (2006.01)
    *H01M 4/02*    (2006.01)

(56) References Cited

U.S. PATENT DOCUMENTS

| | | |
|---|---|---|
| 10,868,331 B2 | 12/2020 | Hotta et al. |
| 2016/0344025 A1 | 11/2016 | Nagai et al. |
| 2018/0277899 A1* | 9/2018 | Takami .................. B60L 58/10 |
| 2020/0295334 A1 | 9/2020 | Seki et al. |

FOREIGN PATENT DOCUMENTS

| | | |
|---|---|---|
| JP | 2019-160748 A | 9/2019 |
| JP | 2020-149930 A | 9/2020 |

\* cited by examiner

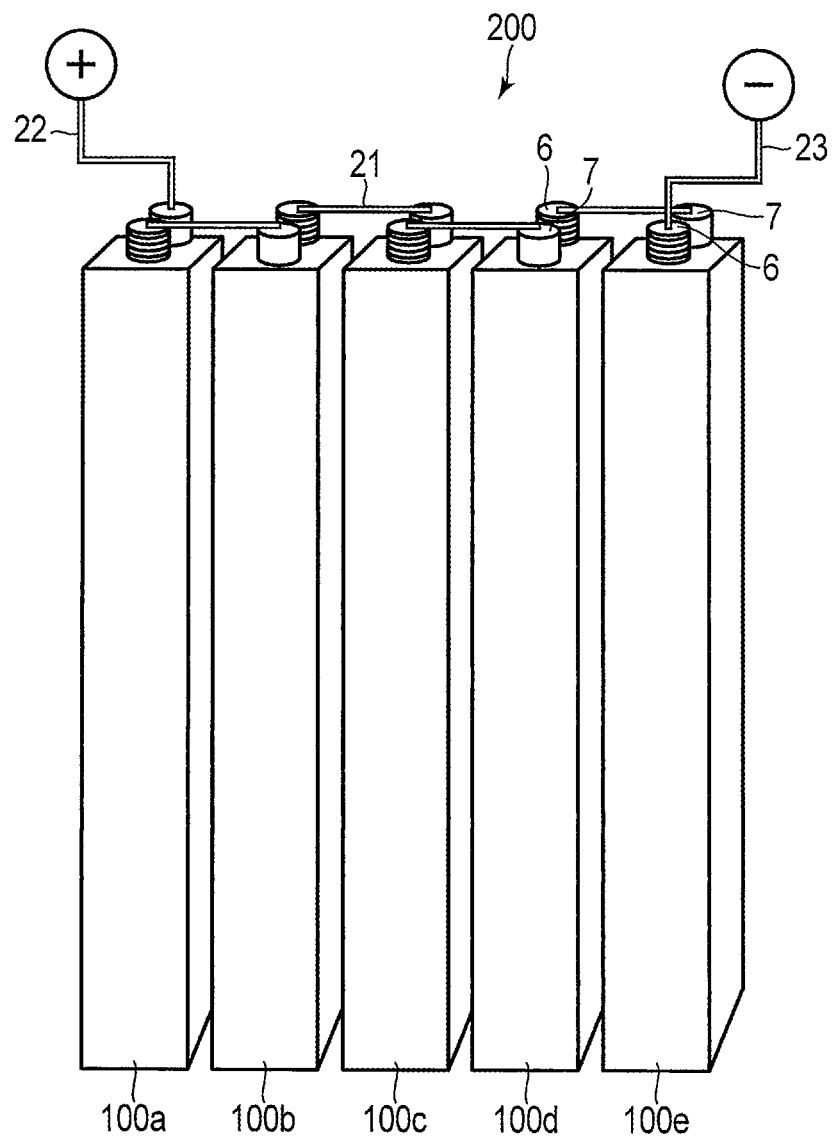
F I G. 6

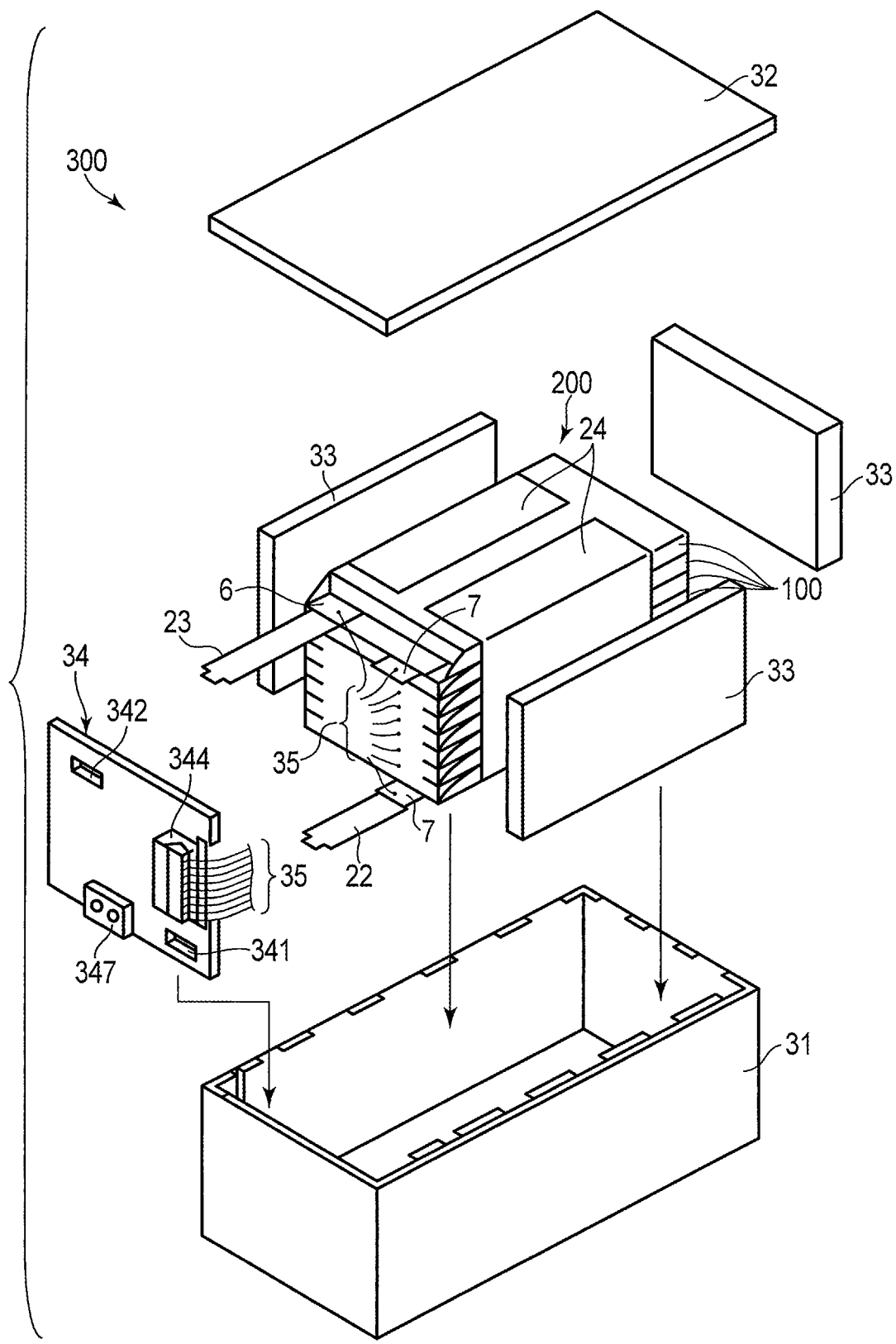
F I G. 7

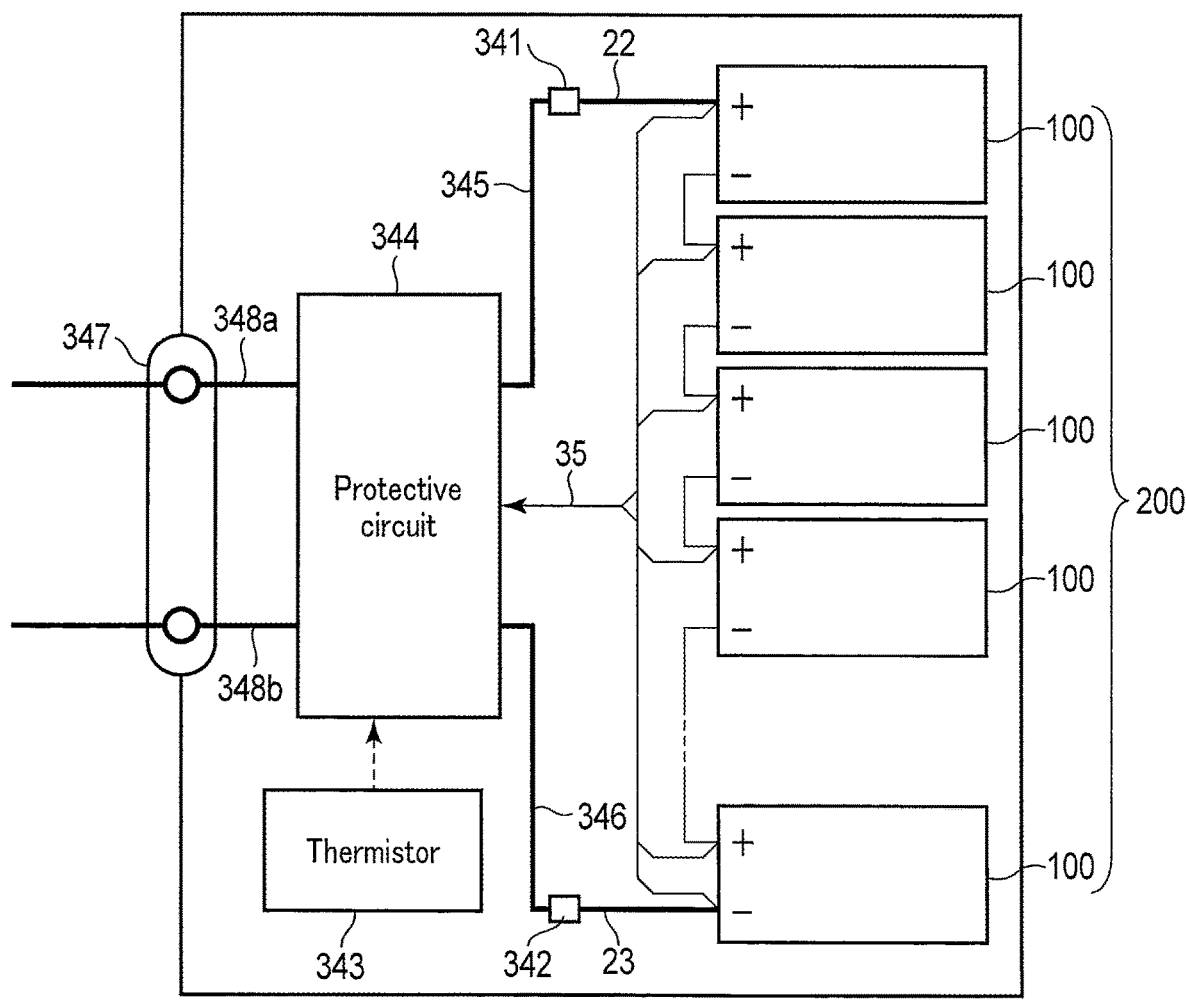
F I G. 8
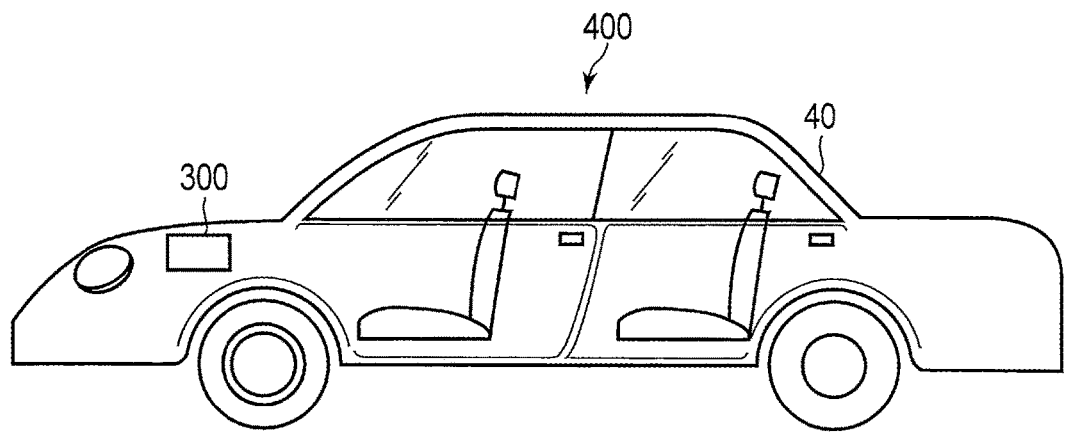
F I G. 9

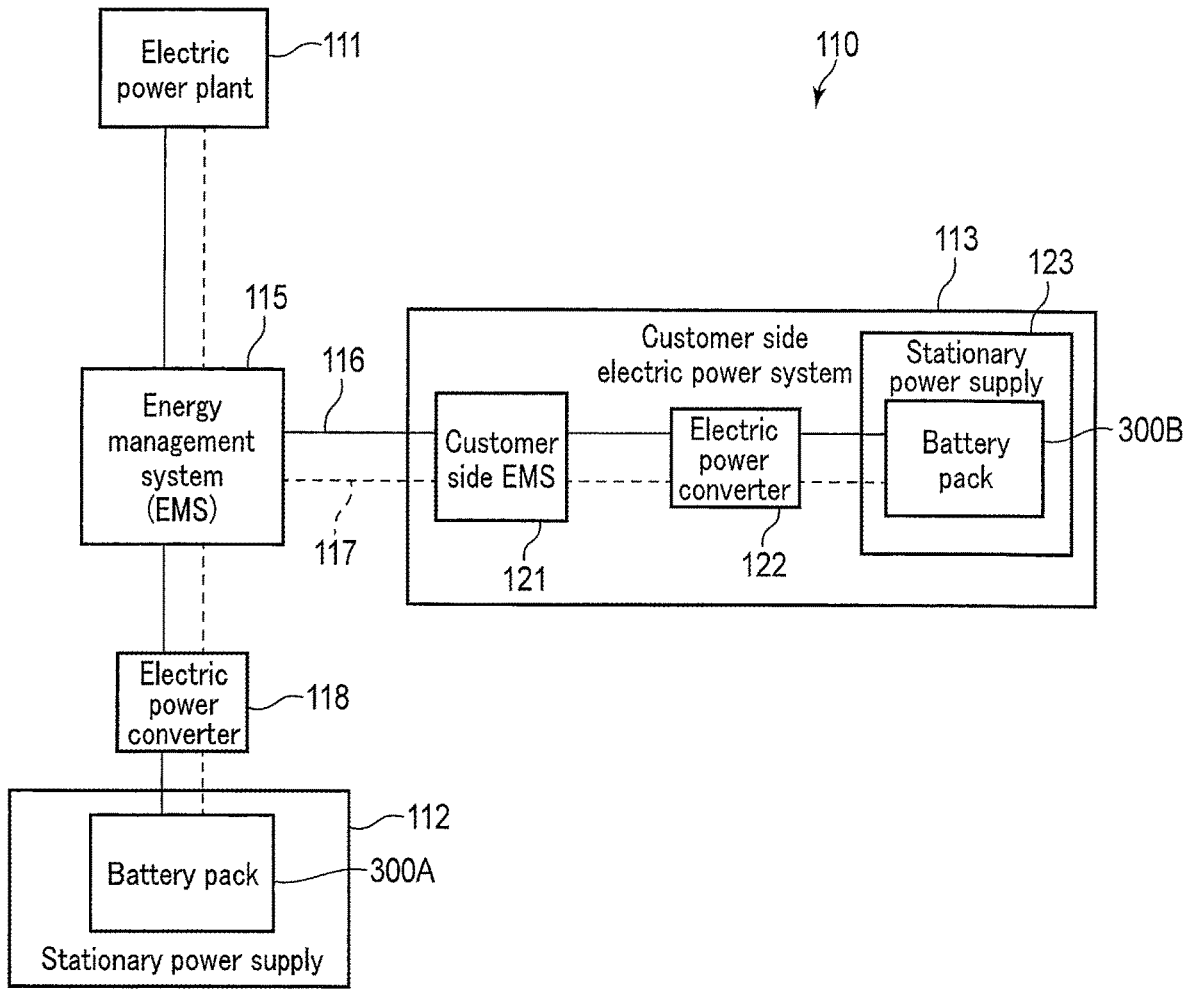
F I G. 10

SECONDARY BATTERY, BATTERY PACK, VEHICLE, AND STATIONARY POWER SUPPLY

CROSS-REFERENCE TO RELATED APPLICATIONS

This application is based upon and claims the benefit of priority from Japanese Patent Application No. 2020-155315, filed Sep. 16, 2020, the entire contents of which are incorporated herein by reference.

FIELD

Embodiments described herein relate generally to a secondary battery, a battery pack, a vehicle, and a stationary power supply.

BACKGROUND

A nonaqueous electrolyte battery formed by using a carbon material or a lithium titanium oxide as a negative electrode active material and a layered oxide that contains nickel, cobalt, manganese, and the like as a positive electrode active material, particularly a lithium secondary battery, has already been in practical use as a power source in a wide range of fields. Such a nonaqueous electrolyte battery is provided in a variety of forms, such as small-sized batteries for various electronic devices and large-sized batteries for electric automobiles. Use of an aqueous solution for an electrolytic solution of such lithium secondary batteries has been considered.

However, a constituent element of a lithium titanium oxide is substituted by a proton ($H^+$) in an aqueous electrolytic solution. As a result, the discharge capacity of the battery decreases, leading to degraded cycle performance.

BRIEF DESCRIPTION OF THE DRAWINGS

FIG. 6 is a perspective view schematically showing an example of the battery module according to a second embodiment;

FIG. 7 is an exploded perspective view schematically showing an example of the battery pack according to a third embodiment;

FIG. 8 is a block diagram showing an example of an electric circuit of the battery pack shown in FIG. 7;

FIG. 9 is a sectional view schematically showing an example of the vehicle according to a fourth embodiment;

FIG. 10 is a block diagram showing an example of a system including the stationary power supply according to a fifth embodiment;

DETAILED DESCRIPTION

Figure 1:
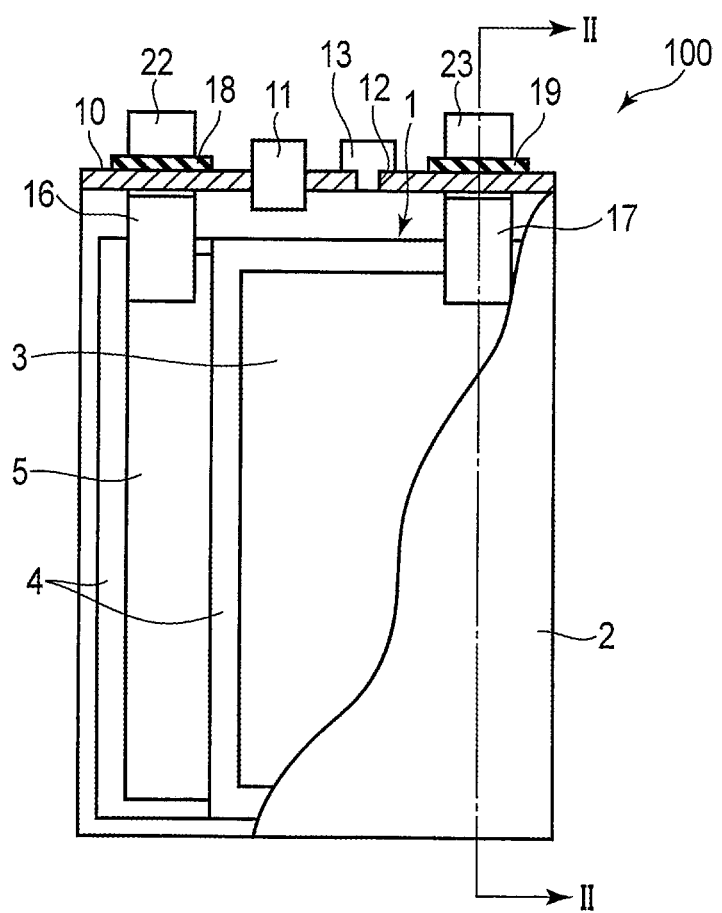
FIG. 1 is a sectional view schematically showing an example of the secondary battery according to a first embodiment.

According to an embodiment, a secondary battery including a positive electrode, a negative electrode, a first electrolyte, and a second electrolyte is provided. The negative electrode includes a lithium titanium oxide having a degree of proton substitution of 0.01 to 0.2. The first electrolyte includes water and in contact with the positive electrode. The second electrolyte includes water and in contact with the negative electrode.

According to another embodiment, a battery pack including the secondary battery according to the embodiment is provided.

According to another embodiment, a vehicle including the battery pack according to the embodiment is provided.

According to another embodiment, a stationary power supply including the battery pack according to the embodiment is provided.

Hereinafter, embodiments will be described with reference to the drawings. The same reference signs are applied to common components throughout the embodiments and overlapped explanations are thereby omitted. Each drawing is a schematic view for encouraging explanations of the embodiment and understanding thereof, and there are thus some details in which a shape, a size and a ratio are different from those in a device actually used, but they can be appropriately design-changed considering the following explanations and known technology.

First Embodiment

According to a first embodiment, a secondary battery is provided. The secondary battery includes a positive electrode, a negative electrode, a first electrolyte in contact with the positive electrode, and a second electrolyte in contact with the negative electrode. The negative electrode includes a lithium titanium oxide having a degree of proton substitution of 0.01 to 0.2. The first electrolyte and the second electrolyte each include water.

When a lithium titanium oxide having a degree of proton substitution of less than 0.01 comes into contact with the first electrolyte or the second electrolyte, a reaction proceeds in which a constituent element of the lithium titanium oxide is substituted by a proton ($H^+$). As a result, the lithium titanium oxide will have randomly generated portions where a charge-and-discharge reaction is less likely to proceed, leading to an occurrence of an uneven charge-and-discharge reaction. This accelerates degradation of the lithium titanium oxide and decreases the cycle performance of the secondary battery. A lithium titanium oxide having a degree of proton substitution of 0.01 or more can suppress a reaction in which its constituent element is substituted by a proton ($H^+$) that occurs when the lithium titanium oxide comes into contact with the first electrolyte or the second electrolyte. As a result, it is possible to suppress an occurrence of an uneven charge-and-discharge reaction in the lithium titanium oxide, which thus allows for an enhanced discharge capacity and cycle performance of the battery.

However, if the degree of proton substitution is too large, the amount of lithium ions inserted into and extracted from the lithium titanium oxide may be decreased. Therefore, the degree of proton substitution is preferably 0.2 or less, and more preferably 0.15 or less. Thereby, excellent charge-and-discharge cycle performance can be achieved.

In addition, the state of charge (SOC) of the negative electrode can be easily estimated. The reason is as follows. A spinel-type $Li_4Ti_5O_{12}$ as an example of the lithium titanium oxide turns to $Li_7Ti_5O_{12}$ when lithium ions are inserted thereinto by charging. Until the battery is fully charged, two phases, $Li_4Ti_5O_{12}$ and $Li_7Ti_5O_{12}$ coexist, during which the charging potential hardly changes and is kept constant. The charging potential then changes precipitously in the final stage of charging. On the other hand, a lithium titanium oxide having a degree of proton substitution of 0.01 or more may take a composition other than $Li_7Ti_5O_{12}$ when lithium ions are inserted thereinto by charging. The composition changes according to the state of charge, and the charging potential also changes in tandem with the change in the composition. Namely, the charge reaction becomes a single solid-phase reaction, not a two-phase coexistence reaction. The discharge reaction also becomes a single solid-phase reaction. Charge and discharge curves by a single solid-phase reaction do not have constant charge voltage or discharge voltage, and have a slope of voltage that relies on the SOC. Thus, the SOC of the negative electrode is easily estimated.

A degree of proton substitution H is represented by the following equation (1):

$$H=(B'-B)/[1+(B'-B)]*3.1 \quad (1)$$

B' is a peak intensity of 25° to 25.5° originating in $TiO_2$ observed when a peak intensity of 18° to 18.5° originating in spinel-type $Li_4Ti_5O_{12}$ in a powder X-ray diffraction (XRD) pattern obtained after heating a lithium titanium oxide at 450° C. for 24 hours is normalized to 1. B is a peak intensity of 25° to 25.5° originating in $TiO_2$ observed when a peak intensity of 18° to 18.5° originating in spinel-type $Li_4Ti_5O_{12}$ in a powder XRD pattern obtained before heating a lithium titanium oxide under the aforementioned conditions is normalized to 1.

When no peak originating in $TiO_2$ can be confirmed in the powder XRD pattern before heating, the amount of $TiO_2$ in an initial state is determined as zero. When a proton-substituted lithium titanium oxide is heated under the aforementioned conditions, the proton is removed in the form of water, leading to the generation of $TiO_2$. As a result, the lithium titanium oxide turns to a composite including spinel-type $Li_4Ti_5O_{12}$ and $TiO_2$. The coefficient 3.1 in equation (1) is a coefficient for converting a ratio of intensity in the powder XRD pattern into a degree of proton substitution. The above coefficient was obtained based on the results of an experiment through which the inventors determined a correlation between a ratio of intensity in a powder XRD pattern and a molar (mol) ratio between spinel-type $Li_4Ti_5O_{12}$ and $TiO_2$.

Figure 11:
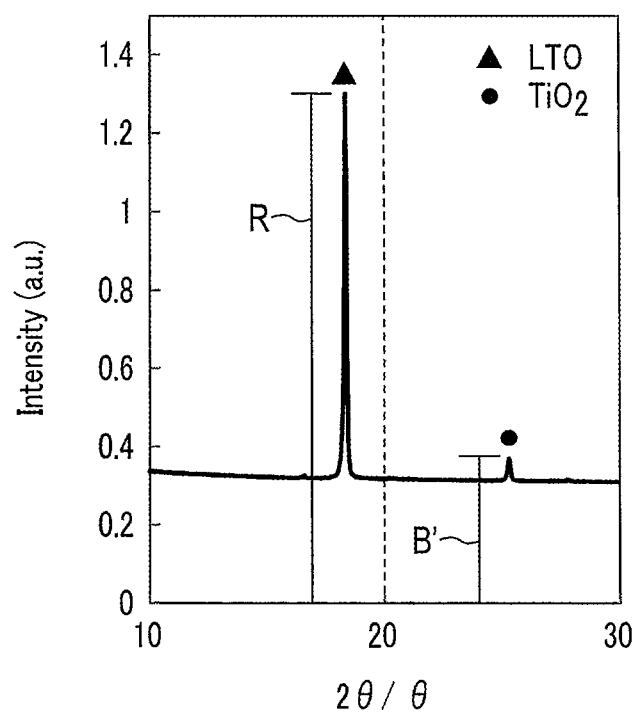
FIG. 11 is a diagram showing an X-ray diffraction (XRD) pattern of a negative electrode active material of Example 1.

FIG. 11 shows a powder X-ray diffraction pattern obtained after heating a negative electrode active material of Example 1 at 450° C. for 24 hours. The peak intensity (peak height) R is a peak intensity of 18° to 18.5° originating in spinel-type $Li_4Ti_5O_{12}$ that is normalized to 1. The peak intensity (peak height) B' is a peak intensity of 25° to 25.5° originating in $TiO_2$.

To remove a negative electrode material, a battery first needs to be discharged. The battery discharging is performed by, for example, discharging a battery at room temperature (25° C.) to a rated final voltage of the battery. Then, the battery is disassembled to remove the electrode. The negative electrode active material is peeled off from the removed electrode, and washed three times with, for example, water. A resultant powder is subjected to an XRD measurement using a powder X-ray diffraction apparatus. The sample is put on a glass holder or a non-reflecting plate to measure an XRD pattern of the sample. The conditions of the measurement of the XRD pattern must be such that Rietveld analysis can be performed. Therefore, the measurement of the XRD pattern is performed under such measurement conditions that a step width of measurement is ⅙ of a minimum half width of a diffraction peak or less, and that an intensity at the highest reflection peak position is 10000 cps or more.

The heating of the lithium titanium oxide at 450° C. for 24 hours is performed by the following method. The temperature is increased from room temperature to 450° C. by 1° C. per minute, and maintained at 450° C. for 24 hours. After the temperature is maintained, the temperature is decreased to room temperature by 0.5° C. per minute.

Hereinafter, the negative electrode, the positive electrode, and the first and second electrolytes will be described.

(1) Negative Electrode

The negative electrode includes a negative electrode current collector and a negative electrode active material-containing layer supported on one or both sides of the negative electrode current collector. The negative electrode active material-containing layer includes a negative electrode active material, and optionally includes a conductive agent and a binder.

As the negative electrode current collector, a material that is electrochemically stable at a potential at which alkali metal ions or alkaline earth metal ions are inserted into and extracted from the negative electrode active material is used. For example, the negative electrode current collector is preferably made of zinc, copper, nickel, stainless steel, aluminum, or an aluminum alloy containing one or more elements selected from magnesium (Mg), titanium (Ti), zinc (Zn), manganese (Mn), iron (Fe), copper (Cu), and silicon (Si). An aluminum alloy foil may contain only one of these elements, or two or more of these elements. The negative electrode current collector may be in other forms such as a porous body or a mesh. The negative electrode current collector more preferably includes Zn.

The thickness of the negative electrode current collector is preferably in the range of 5 μm to 20 μm. A negative electrode current collector having such a thickness can maintain the strength of the negative electrode and the reduction of weight in balance.

Also, the negative electrode current collector may include a section on the surface not supporting the negative electrode active material-containing layer. The section can serve as a negative electrode current collecting tab.

The negative electrode active material-containing layer is disposed on at least one surface of the negative electrode current collector. For example, the negative electrode active material-containing layer may be disposed on one face of the negative electrode current collector, or the negative electrode active material-containing layer may be disposed on one face and the reverse face of the negative electrode current collector.

The negative electrode active material includes a lithium titanium oxide having a degree of proton substitution of 0.01 to 0.2. The lithium titanium oxide having a degree of proton substitution of 0.01 to 0.2 can be represented by, for example, $H_y(Li_{1-x}H_x)_4Ti_5O_{12}$. Here, x and y are specified by $0 \le x < 1$ and $0 \le y < 0.2$, respectively. However, x and y are not 0 at the same time. When x is 1 or more or y is 0.2 or more, a discharge capacity or cycle performance may degrade due to a decrease in the amount of lithium ions inserted into and extracted from the negative electrode active material.

The composition of a proton-substituted lithium titanium oxide can be confirmed by, for example, neutron diffraction; however, the time and costs required for the measurement are not at a practical level. Therefore, it is impractical to specify a target lithium titanium oxide by its composition. A lithium titanium oxide having a degree of proton substitution of 0.01 to 0.2, discovered by the inventors of the present application, achieves excellent cycle performance regardless of its detailed composition, as shown in the Examples.

One or more elements among Li, Ti and O contained in a lithium titanium oxide having a degree of proton substitution of 0.01 to 0.2 may be substituted by an element other than a proton. Examples of a dopant element include alkali metals such as Na and K, alkaline-earth metals such as Mg, Ca, Sr, and Ba, transition metals such as Sc, V, Cr, Fe, Co, Ni, Cu, Y, Zr, Nb, Mo, Ru, Hf, and W, base-metal elements such as Al, Zn, Sn, Ga, and Pb, halogens such as F, Cl, Br, and I, and elements such as N, P, and S. There may be one, two or more kinds of dopant element to be contained.

A lithium titanium oxide having a degree of proton substitution of 0.01 to 0.2 may have a spinel crystal structure.

An example of a method of synthesizing a lithium titanium oxide having a degree of proton substitution of 0.01 to 0.2 will be described below.

Spinel-type $Li_4Ti_5O_{12}$ particles are immersed in an acidic aqueous solution having a pH of 2 or more and less than 7 under an inert gas atmosphere (e.g., under an Ar atmosphere). Thereafter, the particles are washed with water and dried to thereby obtain a target oxide. The degree of proton substitution can be adjusted by changing the temperature of the acidic aqueous solution, the pH of the acidic aqueous solution, the type of acid, the immersion treatment time, or the like.

The temperature of the acidic aqueous solution at the time of the immersion treatment is preferably set in the range of 25° C. to 60° C. Thereby, undue progression of the proton exchange can be suppressed. The temperature of the aqueous solution at the time of the immersion treatment is preferably set to room temperature in order to sufficiently suppress undue proton exchange.

An acid included in the acidic aqueous solution may be one, two or more selected from the group consisting of hydrochloric acid, nitric acid, sulfuric acid, acetic acid, citric acid, and carbonic acid.

The reason why the above-described range constitutes the preferred acidic aqueous solution pH range will be explained as follows. When the pH is less than 2, the active material will be dissolved by the acid or excessive proton exchange will occur, possibly leading to poor discharge capacity. On the other hand, when the pH is 7 or more, proton substitution will not proceed, and a target effect may not be achieved. A more preferred range of the pH is 3 to 6.

The negative electrode active material may include an active material other than a lithium titanium oxide having a degree of proton substitution of 0.01 to 0.2. Examples of other active materials include titanium-containing oxides such as titanium oxide, lithium titanium oxide, niobium titanium oxide, and orthorhombic titanium composite oxide. The Li insertion potential of the titanium-containing oxide is in the range of, for example, 1 V (vs. Li/Li$^+$) to 3 V (vs. Li/Li$^+$). The Li insertion potential of the titanium-containing oxide is preferably in the range of 1.2 V (vs. Li/Li$^+$) to 2.0 V (vs. Li/Li$^+$). The negative electrode active material may include one or two or more of these titanium-containing oxides.

Examples of the titanium oxide include a titanium oxide having a monoclinic structure, a titanium oxide having a rutile structure, and a titanium oxide having an anatase structure. For the titanium oxides having the respective crystal structures, the composition before charge can be represented as $TiO_2$ and the composition after charge can be represented as $Li_xTiO_2$ (x is 0≤x≤1). Further, the structure of the titanium oxide having a monoclinic structure before charge can be represented as $TiO_2$ (B).

Examples of the lithium titanium oxide include a lithium titanium oxide having a spinel structure (e.g., general formula: $Li_{4+x}Ti_5O_{12}$ (x is −1≤x≤3)); and a lithium titanium oxide having a ramsdellite structure (e.g., $Li_{2+x}Ti_3O_7$ (−1≤x≤3)), $Li_{1+x}Ti_2O_4$ (0≤x≤1), $Li_{1.1+x}Ti_{1.8}O_4$ (0≤x≤1), $Li_{1.07+x}Ti_{1.86}O_4$ (0≤x≤1), and $Li_xTiO_2$ (0<x≤1). The lithium titanium oxide may be a lithium titanium composite oxide into which a dopant element is introduced. As an example of the titanium composite oxide, hollandite titanium composite oxide can be cited.

Examples of the niobium titanium oxide include a niobium titanium oxide represented by $Li_aTiM_bNb_{2\pm\beta}O_{7\pm\sigma}$ (0≤a≤5, 0≤b≤0.3, 0≤β≤0.3, 0≤σ≤0.3; M is at least one kind of element selected from the group consisting of Fe, V, Mo, and Ta).

Examples of the orthorhombic titanium-containing composite oxide include a compound represented by $Li_{2+a}M(I)_{2-b}Ti_{6-c}M(II)_dO_{14+\sigma}$. Here, M(I) is at least one selected from the group consisting of Sr, Ba, Ca, Mg, Na, Cs, Rb, and K. M(II) is at least one selected from the group consisting of Zr, Sn, V, Nb, Ta, Mo, W, Y, Fe, Co, Cr, Mn, Ni, and Al. Each subscript in the compositional formula satisfies: 0≤a≤6, 0≤b<2, 0≤c<6, 0≤d<6, and −0.5≤σ≤0.5. As a specific example of the orthorhombic titanium-containing composite oxide, $Li_{2+a}Na_2Ti_6O_{14}$ (0≤a≤6) can be cited.

The negative electrode includes a negative electrode active material, for example, in the form of particles. Negative electrode active material particles may be single primary particles, secondary particles which are aggregates of the primary particles, or a mixture of single primary particles and secondary particles. The shape of the particles is not particularly limited, and may be, for example, spherical, elliptical, flat, fibrous, or the like.

The average particle size of the negative electrode active material particles may be 1 μm or less. The lower limit thereof is preferably 0.001 μm.

The average particle size of the negative electrode active material particles is measured by the following method: using a laser diffraction particle size analyzer (SALD-300 manufactured by Shimadzu Corporation, or an apparatus having a function equivalent thereto), all of a sample in an amount of about 0.1 g, a surfactant, and distilled water in an amount of 1 to 2 mL are added to a beaker, sufficiently stirred, and then poured in a stirring vessel. This is followed by measurement of a light intensity distribution performed 64 times at two-second intervals and an analysis of particle size distribution data.

A conductive agent is added to increase the current-collecting performance and suppress the contact resistance between the active material and the current collector. Examples of the conductive agent include carbonaceous materials such as vapor grown carbon fiber (VGCF), carbon nanotube, carbon black such as acetylene black, and graphite. One of these materials may be used as the conductive agent, or two or more of these materials may be combined and used as the conductive agent. Alternatively, instead of using the conductive agent, carbon coating or electron conductive inorganic material coating may be performed on the surfaces of the active material particles.

A binder is added to fill gaps between dispersed active materials and to bind the active material and the negative electrode current collector. Examples of the binder include polytetrafluoroethylene (PTFE), fluorine rubber, styrene butadiene rubber, polyacrylate compound, imide compound, carboxyl methyl cellulose (CMC), salts of CMC, and polyacrylimide (PAI). One, two or more of these materials in combination form may be used as the binder.

In regard to the compounding proportions of the negative electrode active material, the conductive agent, and the binder in the negative electrode active material-containing layer, it is preferable that the negative electrode active material be in the range of 70% by mass to 95% by mass, the conductive agent be in the range of 3% by mass to 20% by mass, and the binder be in the range of 2% by mass to 10% by mass. When the compounding proportion of the conductive agent is 3% by mass or more, current-collecting performance of the negative electrode active material-containing layer can be improved. When the compounding proportion of the binder is 2% by mass or more, sufficient electrode strength can be obtained, and when the compounding proportion of the binder is 10% by mass or less, insulating parts of the electrode can be reduced.

The density of the negative electrode active material-containing layer (excluding the current collector) is preferably in the range of 1.8 g/cm$^3$ to 2.8 g/cm$^3$. A negative electrode in which the density of the negative electrode active material-containing layer is within this range is excellent in both energy density and the retention of an aqueous electrolyte. The density of the negative electrode active material-containing layer is more preferably in the range of 2.1 g/cm$^3$ to 2.6 g/cm$^3$.

A negative electrode can be produced by, for example, the following method. First, a negative electrode active material, a conductive agent, and a binder are suspended in a solvent to prepare a slurry. The slurry is applied to one side or both sides of a negative electrode current collector. Next, the applied slurry is dried to obtain a stack of the negative electrode active material-containing layer and the negative electrode current collector. Then, the stack is pressed. In this manner, a negative electrode is produced.

Alternatively, a negative electrode may be produced by the following method. First, a negative electrode active material, a conductive agent, and a binder are mixed to obtain a mixture thereof. Next, the mixture is molded into a pellet form. Then, the resultant pellets are arranged on the negative electrode current collector, whereby a negative electrode can be obtained.

(2) Positive Electrode

The positive electrode may include a positive electrode current collector and a positive electrode active material-containing layer. The positive electrode active material-containing layer may be formed on one side or both sides of the positive electrode current collector. The positive electrode active material-containing layer may include a positive electrode active material, and optionally include a conductive agent and a binder.

The positive electrode current collector is preferably titanium, aluminum, or an aluminum alloy containing one or more elements selected from Mg, Ti, Zn, Ni, Cr, Mn, Fe, Cu, and Si.

The thickness of the positive electrode current collector is preferably in the range of 5 µm to 20 µm, and more preferably 15 µm or less.

Also, the positive electrode current collector may include a section on the surface where no positive electrode active material-containing layer is formed. The section can serve as a positive electrode current collecting tab.

The positive electrode active material-containing layer is disposed on at least one surface of the positive electrode current collector. For example, the positive electrode active material-containing layer may be disposed on one face of the positive electrode current collector, or the positive electrode active material-containing layer may be disposed on one face and the reverse face of the positive electrode current collector.

As the positive electrode active material, for example, an oxide or sulfide can be used. The positive electrode may include one kind of compound alone as the positive electrode active material or two or more kinds of compounds in combination. Examples of the oxide and sulfide include compounds capable of having an alkali metal, alkali metal ions, an alkaline earth metal, or alkaline earth metal ions be inserted and extracted. A compound capable of having lithium or lithium ions inserted and extracted is preferably used.

Examples of such compounds include manganese dioxide ($MnO_2$), iron oxide, copper oxide, nickel oxide, lithium manganese composite oxides (e.g., $Li_xMn_2O_4$ or $Li_xMnO_2$; $0<x\le1$), lithium nickel composite oxides (e.g., $Li_xNiO_2$; $0<x\le1$), lithium cobalt composite oxides (e.g., $Li_xCoO_2$; $0<x\le1$), lithium nickel cobalt composite oxides (e.g., $Li_xNi_{1-y}Co_yO_2$; $0<x\le1$, $0<y<1$), lithium manganese cobalt composite oxides (e.g., $Li_xMn_yCo_{1-y}O_2$; $0<x\le1$, $0<y<1$), lithium manganese nickel composite oxides having a spinel structure (e.g., $Li_xMn_{2-y}Ni_yO_4$; $0<x\le1$, $0<y<2$), lithium phosphates having an olivine structure (e.g., $Li_xFePO_4$; $0<x\le1$, $Li_xFe_{1-y}Mn_yPO_4$; $0<x\le1$, $0<y<1$, and $Li_xCoPO_4$; $0<x\le1$), iron sulfate [$Fe_2(SO_4)_3$], vanadium oxides (e.g., $V_2O_5$), and lithium nickel cobalt manganese composite oxide ($Li_xNi_{1-y-z}Co_yMn_zO_2$; $0<x\le1$, $0<y<1$, $0<z<1$, $y+z<1$).

Among the above compounds, examples of more preferred compounds as the positive electrode active material include lithium manganese composite oxides having a spinel structure (e.g., $Li_xMn_2O_4$; $0<x\le1$), lithium nickel composite oxides (e.g., $Li_xNiO_2$; $0<x\le1$), lithium cobalt composite oxides (e.g., $Li_xCoO_2$; $0<x\le1$), lithium nickel cobalt composite oxides (e.g., $Li_xNi_{1-y}Co_yO_2$; $0<x\le1$, $0<y<1$), lithium manganese nickel composite oxides having a spinel structure (e.g., $Li_xMn_{2-y}Ni_yO_4$; $0<x\le1$, $0<y<2$), lithium manganese cobalt composite oxides (e.g., $Li_xMn_yCo_{1-y}O_2$; $0<x\le1$, $0<y<1$), lithium iron phosphates (e.g., $Li_xFePO_4$; $0<x\le1$), and lithium nickel cobalt manganese composite oxides ($Li_xNi_{1-y-z}Co_yMn_zO_2$; $0<x\le1$, $0<y<1$, $0<z<1$, $y+z<1$). When these compounds are used as the positive electrode active material, the positive electrode potential can be increased.

The primary particle size of the positive electrode active material is preferably in the range of 100 nm to 1 µm. The positive electrode active material having a primary particle size of 100 nm or more is easy to handle during industrial production. In the positive electrode active material having a primary particle size of 1 µm or less, diffusion of alkali metal ions and alkaline earth metal ions within the solid can proceed smoothly.

The specific surface area of the positive electrode active material is preferably in the range of 0.1 m$^2$/g to 10 m$^2$/g. A positive electrode active material having a specific surface area of 0.1 m²/g or more can adequately secure insertion/extraction sites of alkali metal ions and alkaline earth metal ions. A positive electrode active material having a specific surface area of 10 m²/g or less is easy to handle during industrial production and can also ensure favorable charge-and-discharge cycle performance.

The binder is added to fill gaps between the dispersed positive electrode active materials and to bind the positive electrode active material and the positive electrode current collector. Examples of the binder include polytetrafluoroethylene (PTFE), polyvinylidene fluoride (PVdF), fluorine rubber, polyacrylate compounds, imide compounds, carboxyl methyl cellulose (CMC), salts of CMC, and polyacrylimide (PAI). One, two or more of these in combination form may be used as the binder.

The conductive agent is added to enhance current-collecting performance and to suppress the contact resistance between the positive electrode active material and the positive electrode current collector. Examples of the conductive agent include carbonaceous materials such as vapor grown carbon fiber (VGCF), carbon nanotube, carbon black such as acetylene black, and graphite. One, two or more of these in combination form may be used as the conductive agent. Alternatively, the conductive agent may be omitted.

In the positive electrode active material-containing layer, the positive electrode active material and the binder are preferably blended in proportions of 80% by mass to 98% by mass, and 2% by mass to 20% by mass, respectively.

By setting the amount of the binder to 2% by mass or more, sufficient electrode strength can be obtained. The binder may also function as an insulator. Thus, if the amount of the binder is set to 20% by mass or less, the amount of the insulator included in the electrode decreases, and internal resistance can consequently be decreased.

When a conductive agent is added, the positive electrode active material, the binder, and the conductive agent are preferably blended in proportions of 77% by mass to 95% by mass, 2% by mass to 20% by mass, and 3% by mass to 15% by mass, respectively.

By setting the amount of the conductive agent to 3% by mass or more, the above effect can be exhibited. Also, by setting the amount of the conductive agent to 15% by mass or less, the proportion of the conductive agent in contact with the electrolyte can be reduced. When this proportion is low, decomposition of the electrolyte can be reduced during storage under high temperatures.

The positive electrode can be produced by, for example, the following method. First, a positive electrode active material, a conductive agent, and a binder are suspended in a solvent to prepare a slurry. The slurry is applied to one side or both sides of a positive electrode current collector. Next, the applied slurry is dried to obtain a stack of the positive electrode active material-containing layer and the positive electrode current collector. Then, the stack is pressed. In this manner, a positive electrode is produced.

Alternatively, a positive electrode may be produced by the following method. First, a positive electrode active material, a conductive agent, and a binder are mixed to obtain a mixture thereof. Next, the mixture is molded into a pellet form. Then, the resultant pellets are arranged on the positive electrode current collector, whereby a positive electrode can be obtained.

(3) First Electrolyte and Second Electrolyte

The first electrolyte is in contact with at least the positive electrode. The first electrolyte may be held by the positive electrode. The first electrolyte may also be in contact with the negative electrode, the separator, or other members in addition to the positive electrode. Alternatively, the first electrolyte may be in contact with only the positive electrode.

The second electrolyte is in contact with at least the negative electrode. The second electrolyte may be held by the negative electrode. The second electrolyte may also be in contact with the positive electrode, the separator, or other members in addition to the negative electrode. Alternatively, the second electrolyte may be in contact with only the negative electrode.

The composition of the first electrolyte may be different from or the same as the composition of the second electrolyte.

The first electrolyte and the second electrolyte each include water. The first electrolyte and the second electrolyte may be aqueous electrolytes.

The concentration of the water in the first electrolyte and the second electrolyte is preferably 0.1 mol/L or more. A method of measuring the concentration of the water will be described. An electrolyte having a target salt concentration is prepared (unit: mol/L). The weight per 1 mL of the electrolyte is measured to obtain the density (g/L). Since the concentration (mol/L) of the salt contained per 1 L is known in advance at the time of the preparation of the electrolyte, the amount (g/L) of the salt contained per 1 L can be obtained. When the concentration (mol/L) of the salt contained per 1 L is not known, the concentration can be obtained by, for example, an ICP (inductively coupled plasma) emission spectrometry, which will be described below, to obtain the amount (g/L) of the salt contained per 1 L. A value (g/L) obtained by subtracting said amount of salt from the density represents the amount of water contained per liter, and a value (mol/L) obtained by dividing this value by the amount of substance of 18 of water represents the concentration of the water. By setting each of the concentrations of the water in the first electrolyte and the second electrolyte to 0.1 mol/L or more, charge and discharge can be facilitated. By setting the concentration of the water to 10 mol/L or more, the cycle performance of the secondary battery can be further improved.

The concentration of the water in the first electrolyte may be the same as or different from the concentration of the water in the second electrolyte. An aqueous electrolyte, which is one form of the first electrolyte and the second electrolyte, will be described below.

An aqueous electrolyte includes an aqueous solvent and an electrolyte salt. The aqueous electrolyte is, for example, a liquid. The liquid aqueous electrolyte is an aqueous solution prepared by dissolving an electrolyte salt as a solute in an aqueous solvent. In the aqueous solution, the amount of the aqueous solvent is preferably 1 mol or more, and more preferably 3.5 mol or more with respect to 1 mol of salt as a solute.

A solution containing water can be used as the aqueous solvent. The solution containing water may be pure water or a mixed solvent of water and an organic solvent. For example, the aqueous solvent contains water in a proportion of 50% by volume or more.

That the aqueous electrolyte contains water can be confirmed by GC-MS (Gas Chromatography-Mass Spectrometry) measurement. In addition, the salt concentration and the water content in the aqueous electrolyte can be measured by, for example, ICP emission spectrometry. The molar concentration (mol/L) can be calculated by measuring a predetermined amount of aqueous electrolyte and calculating the concentration of contained salt. In addition, the number of moles of the solute and the solvent can be calculated by measuring the specific gravity of the aqueous electrolyte.

The aqueous electrolyte may be a gelatinous electrolyte. The gelatinous electrolyte is prepared by mixing the above-described liquid aqueous electrolyte and a polymeric compound to obtain a composite thereof. Examples of the polymeric compound include polyvinylidene fluoride (PVdF), polyacrylonitrile (PAN), and polyethylene oxide (PEO).

For example, a lithium salt, a sodium salt, or a mixture thereof can be used as an electrolyte salt. One or two or more kinds of electrolyte salts may be used.

For example, the following can be used as the lithium salt: lithium chloride (LiCl); lithium bromide (LiBr); lithium hydroxide (LiOH); lithium sulfate ($Li_2SO_4$); lithium nitrate ($LiNO_3$); lithium acetate ($CH_3COOLi$); lithium oxalate ($Li_2C_2O_4$); lithium carbonate ($Li_2CO_3$); lithiumbis(trifluoromethanesulfonyl)imide (LiTFSI; $LiN(SO_2CF_3)_2$); lithiumbis(fluorosulfonyl)imide (LiFSI; $LiN(SO_2F)_2$); and lithiumbisoxalateborate ($LiBOB:LiB[(OCO)_2]_2$).

For example, the following can be used as the sodium salt: sodium chloride (NaCl); sodium sulfate ($Na_2SO_4$); sodium hydroxide (NaOH); sodium nitrate ($NaNO_3$), and sodium trifluoromethanesulfonamide (NaTFSA).

The lithium salt preferably includes LiCl. When LiCl is used, the concentration of the lithium ions in the aqueous electrolyte can be increased. Also, the lithium salt preferably includes at least one of $LiSO_4$ and LiOH in addition to LiCl.

The molar concentration of the lithium ions in the aqueous electrolyte may be 3 mol/L or more, 6 mol/L or more, and 12 mol/L or more. As an example, the molar concentration of the lithium ions in the aqueous electrolyte is 14 mol/L or less. When the concentration of the lithium ions in the aqueous electrolyte is high, electrolysis of the aqueous solvent in the negative electrode is easily suppressed, and generation of hydrogen from the negative electrode is less likely to occur.

The aqueous electrolyte preferably includes, as anion species, at least one or more selected from chlorine ion ($Cl^-$), hydroxide ion ($OH^-$), sulfate ion ($SO_4^{2-}$), and nitrate ion ($NO_3^-$).

The aqueous electrolyte may include a surfactant. Examples of the surfactant include non-ionic surfactants such as polyoxyalkylene alkyl ether, polyethylene glycol, polyvinyl alcohol, thiourea, 3,3'-dithiobis(1-propane phosphonic acid)2 sodium, dimercaptothiadiazole, boric acid, oxalic acid, malonic acid, saccharin, sodium naphthalenesulfonate, gelatin, potassium nitrate, aromatic aldehyde, and heterocyclic aldehyde. One, two or more of the above in mixture form may be used as the surfactant.

The aqueous electrolyte may include a pH adjuster. Examples of the pH adjuster include HCl and LiOH. The pH adjuster may be used alone or in the form of a mixture of two or more of them. Alternatively, the electrolyte salt can double as a pH adjuster.

The pH of the aqueous electrolyte is preferably in the range of 3 to 14 and more preferably in the range of 4 to 13. The temperature for the measurement of the pH is 25° C. The pH of the aqueous electrolyte can be set to 8 or more. A preferred range is higher than 8. By setting the pH of the second electrolyte to 8 or more, undue progression of the proton substitution reaction in the lithium titanium oxide can be suppressed. A more preferred range is higher than 8. The pH of the first and second electrolytes may be the same or different. When the pH of the first and second electrolytes differs, the pH of the second electrolyte is preferably set to be larger than the pH of the first electrolyte. Thereby, progression of the proton substitution reaction in the lithium titanium oxide can be suppressed in the negative electrode, and generation of oxygen can be suppressed in the positive electrode. In order to further enhance the cycle performance by suppressing both proton substitution reaction and oxygen generation, it is preferable to set the pH of the second electrolyte to be 8 or more, and to be larger than the pH of the first electrolyte. A more preferred range is higher than 8. The upper limit of the pH of the second electrolyte may be set to 14 or less, or 13 or less.

Hereinafter, a method for measuring the properties of an aqueous electrolyte will be described.

When the aqueous electrolyte to be measured is included in an already-produced battery, for example, the aqueous electrolyte is extracted in the manner described below.

A hole is opened in the exterior of a battery, for example, at the bottom of a cylindrical battery, and then the battery is put into a collection container. Both the battery and the collection container are introduced into a high-speed centrifuge and a liquid electrolyte is extracted from the inside of the battery to the collection container by a centrifugal force.

<Method of Measuring pH of Aqueous Electrolyte>

The pH of the aqueous electrolyte can be measured by pH test paper. For example, the measurement of pH is made as described below.

For the measurement, for example, stick-shaped pH test paper made by MACHEREY-NAGEL is used. The pH test paper is immersed in the aqueous electrolyte maintained to have a temperature of 25° C., and then lifted. The next step should not begin until the color change of the discolored portion is completed. When the discoloration is completed, the finally obtained color is checked against the color guide to determine the pH value.

(4) Separator

A separator may be disposed between the positive electrode and the negative electrode. The separator is formed from, for example, a porous film containing polyethylene (PE), polypropylene (PP), cellulose, or polyvinylidene fluoride (PVdF), or a synthetic resin nonwoven fabric.

The separator may include an ion exchange membrane or a solid electrolyte. When an ion exchange membrane or a solid electrolyte is used as a separator, two different aqueous electrolytes may be used for the positive electrode side and the negative electrode side respectively. For example, referring to the aqueous electrolyte on the positive electrode side as a "first aqueous electrolyte" and the aqueous electrolyte on the negative electrode side as a "second aqueous electrolyte", the first aqueous electrolyte and the second aqueous electrolyte can be isolated from each other by the ion exchange membrane or the solid electrolyte. That is, by using an appropriate separator, a battery in which only the first aqueous electrolyte is in contact with the positive electrode can be obtained. Similarly, a battery in which only the second aqueous electrolyte is in contact with the negative electrode can be obtained.

The ion exchange membrane is, for example, a cation exchange membrane having monovalent selectivity. When such an ion exchange membrane is used, only alkali metal ions may be selectively permeated through the ion exchange membrane. Other ions contained in the aqueous electrolyte, for example, anion species, do not permeate the cation exchange membrane. Examples of the alkali metal ions include lithium ions and/or sodium ions.

Alternatively, the ion exchange membrane is, for example, a cation exchange membrane having divalent selectivity. When such an ion exchange membrane is used, only alkaline earth metal ions may be selectively permeated through the ion exchange membrane. Other ions contained in the aqueous electrolyte, for example, anion species, do not permeate the cation exchange membrane. Examples of the alkaline earth metal ions include magnesium ions and/or calcium ions.

A solid electrolyte layer including solid electrolyte particles may also be used as a separator. The solid electrolyte layer may include one kind of solid electrolyte particles or more than one kind of solid electrolyte particles. The solid electrolyte layer may be a solid electrolyte composite membrane including solid electrolyte particles. The solid electrolyte composite membrane is, for example, a membrane obtained by forming solid electrolyte particles into a membrane shape using a polymeric binder. The solid electrolyte layer may include at least one selected from the group consisting of a plasticizer and an electrolyte salt. For example, when the solid electrolyte layer includes an electrolyte salt, the alkali metal ion conductivity of the solid electrolyte layer can be further enhanced.

Examples of the polymeric binder include polyether compounds, polyester compounds, polyamine compounds, polyethylene compounds, silicone compounds, and polysulfide compounds.

An inorganic solid electrolyte is, for example, an oxide-based solid electrolyte or a sulfide-based solid electrolyte. A lithium phosphate solid electrolyte having a NASICON-type structure and represented by a general formula $LiM_2(PO_4)_3$ is preferably used as the oxide-based solid electrolyte. M in the above general formula is preferably at least one or more elements selected from the group consisting of titanium (Ti), germanium (Ge), strontium (Sr), zirconium (Zr), tin (Sn), and aluminum (Al). The element M more preferably includes any one of Ge, Zr, and Ti, and Al.

A specific example of the lithium phosphate solid electrolyte having a NASICON-type structure is LATP $(Li_{1+x}Al_xTi_{2-x}(PO_4)_3)$, $Li_{1+x}Al_xGe_{2-x}(PO_4)_3$, $Li_{1+x}Al_xZr_{2-x}(PO_4)_3$. In the above formula, x is in a range of $0<x\leq 5$, preferably in a range of $0.1\leq x\leq 0.5$. LATP is preferably used as the solid electrolyte. LATP has excellent water resistance and is less likely to undergo hydrolysis in the secondary battery.

Also, amorphous LIPON $(Li_xPO_yN_z$; $2.6\leq x\leq 3.5$, $1.9\leq y\leq 3.8$, $0.1\leq z\leq 1.3$, for example, $Li_{2.9}PO_{3.3}N_{0.46})$, or an inorganic compound having a garnet structure may be used as the oxide-based solid electrolyte. The inorganic compound having a garnet structure is preferable because it has high Li-ion conductivity and high reduction resistance and has a wide electrochemical window. The inorganic compound having a garnet structure is, for example, $Li_{5+x}A_yLa_{3-y}M_2O_{12}$ (A is at least one selected from the group consisting of Ca, Sr, and Ba, and M is at least one selected from the group consisting of Nb and Ta), $Li_3M_{2-x}Zr_2O_{12}$ (M is at least one selected from the group consisting of Ta and Nb), $Li_{7-3x}Al_xLa_3Zr_3O_{12}$, or $Li_7La_3Zr_2O_{12}$ (LLZ). In the above formula, x is, for example, $0\leq x\leq 0.8$, preferably $0\leq x\leq 0.5$, and y is, for example, $0\leq y\leq 2$. The inorganic compound having a garnet structure may be made of one of these compounds or include a mixture of two or more of these compounds. Among them, $Li_{6.25}Al_{0.25}La_3Zr_3O_{12}$ and $Li_7La_3Zr_2O_{12}$, which have high ion conductivity and are electrochemically stable, are excellent in both discharge and cycle life performance.

A sodium-containing solid electrolyte may be used as the solid electrolyte. Sodium-containing solid electrolytes have excellent ion conductivity of sodium ions. Examples of the sodium-containing solid electrolytes include β-alumina, sodium phosphorus sulfide, and sodium phosphorus oxide. The sodium ion-containing solid electrolyte is preferably in the form of glass ceramics.

Among the above, the solid electrolyte preferably includes an inorganic compound having a garnet structure.

A lithium salt, a sodium salt, or a mixture thereof is preferably used as an electrolyte salt. Examples of the lithium salts and sodium salts are as described above. One or more kinds of electrolyte salts may be used.

(5) Container Member

As the container member that houses the positive electrode, the negative electrode, and the first and second electrolytes, a metal container, a laminated film container, or a resin container may be used.

As the metal container, a metal can made of nickel, iron, stainless steel, or the like and having a quadrangular shape or a cylindrical shape may be used. As the resin container, a container made of polyethylene, polypropylene, or the like may be used.

The board thickness of each of the resin container and the metal container preferably falls within the range of 0.05 mm to 1 mm. The board thickness is more preferably 0.5 mm or less, and even more preferably 0.3 mm or less.

As the laminated film, for example, a multilayered film formed by covering a metal layer with a resin layer may be used. Examples of the metal layer include a stainless steel foil, an aluminum foil, and an aluminum alloy foil. As the resin layer, a polymer such as polypropylene (PP), polyethylene (PE), nylon, or polyethylene terephthalate (PET) may be used. The thickness of the laminated film preferably falls within the range of 0.01 mm to 0.5 mm. The thickness of the laminated film is more preferably 0.2 mm or less.

(6) Negative Electrode Terminal

The negative electrode terminal may be formed, for example, from a material that is electrochemically stable at the potential of alkali metal ion insertion/extraction of the negative electrode active material and has electrical conductivity. Specifically, the material for the negative electrode terminal may be zinc, copper, nickel, stainless steel, aluminum, or an aluminum alloy containing at least one element selected from the group consisting of Mg, Ti, Zn, Mn, Fe, Cu, and Si. As the material for the negative electrode terminal, zinc or a zinc alloy is preferably used. In order to reduce the contact resistance between the negative electrode terminal and the negative electrode current collector, the negative electrode terminal is preferably made of the same material as that of the negative electrode current collector.

(7) Positive Electrode Terminal

The positive electrode terminal may be formed from a material that is electrically stable in a potential range of 2.5 V to 5.5 V with respect to oxidation-reduction potential of lithium (vs. $Li/Li^+$) and has electrical conductivity. The material for the positive electrode terminal may be aluminum, or an aluminum alloy containing at least one element selected from the group consisting of Mg, Ti, Zn, Mn, Fe, Cu, and Si. In order to reduce the contact resistance between the positive electrode terminal and the positive electrode current collector, the positive electrode terminal is preferably made of the same material as that of the positive electrode current collector.

(8) Description of Details of Secondary Battery

The secondary battery according to the present embodiment may be used in various forms such as a rectangular shape, a cylindrical shape, a flat form, a thin form, and a coin form. In addition, the secondary battery may be a secondary battery having a bipolar structure. A secondary battery having a bipolar structure has an advantage of being able to produce a cell with in-series connection of multiple, using a single cell.

Details of the secondary battery according to the first embodiment will be described below with reference to FIGS. 1 to 5.

Figure 2:
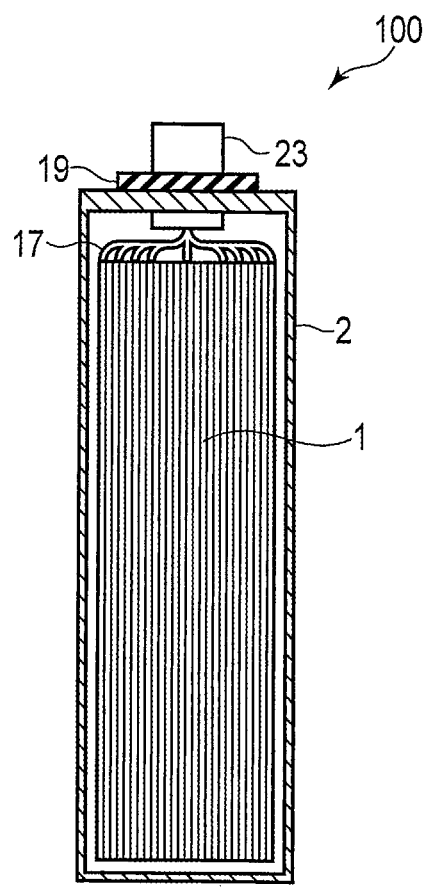
FIG. 2 is a sectional view of the secondary battery shown in FIG. 1 taken along a line II-II.

FIG. 1 is a sectional view schematically showing an example of the secondary battery according to the first embodiment. FIG. 2 is a sectional view of the secondary battery shown in FIG. 1 taken along a line II-II.

An electrode group 1 is housed in a rectangular tubular metal container as the container member 2. The electrode group 1 has a structure formed by spirally winding a positive electrode 5 and a negative electrode 3 with a separator 4 interposed therebetween so as to form a flat shape. An aqueous electrolyte (not shown) is held by the electrode group 1. As shown in FIG. 1, a strip-shaped positive electrode tab 16 is electrically connected to each of plural positions at an end of the positive electrode 5 located on an end face of the electrode group 1. In addition, a strip-shaped negative electrode tab 17 is electrically connected to each of plural positions at an end of the negative electrode 3 located on the end face. The plural positive electrode tabs 16 are electrically connected to a positive electrode-side lead 22 in a bundled state. A positive electrode terminal is structured from the positive electrode tabs 16 and the positive electrode-side lead 22. The negative electrode tabs 17 are connected to a negative electrode-side lead 23 in a bundled state. A negative electrode terminal is structured from the negative electrode tabs 17 and the negative electrode-side lead 23. A sealing plate 10 made of metal is fixed to the opening of the metal container (container member 2) by welding or the like. The positive electrode-side lead 22 and the negative electrode-side lead 23 are extracted to the outside from outlets provided on the sealing plate 10, respectively. The inner periphery of each outlet on the sealing plate 10 is coated with an insulating member to avoid a short circuit caused by contact of the sealing plate 10 to the positive electrode-side lead 22 and the negative electrode-side lead 23.

As shown in FIG. 2, the other end of the negative electrode tab 17 has a strip shape and is electrically connected to each of plural positions at an end of the negative electrode 3 located on the upper end face of the electrode group 1. Although not illustrated, similarly, the other end of the positive electrode tab 16 has a strip shape and is electrically connected to each of plural positions at an end of the positive electrode 5 located on the upper end face of the electrode group 1.

In FIG. 1, the sealing plate 10 made of metal is fixed over the opening of the metal container (container member 2) by welding or the like. The positive electrode-side lead 22 and the negative electrode-side lead 23 are extracted to the outside from outlets provided on the sealing plate 10, respectively. On the inner peripheral surfaces of the outlets on the sealing plate 10, a positive electrode gasket 18 and a negative electrode gasket 19 are provided to avoid a short circuit caused by contact of the sealing plate 10 to the positive electrode-side lead 22 and the negative electrode-side lead 23. When the positive electrode gasket 18 and the negative electrode gasket 19 are provided, the airtightness of the quadrangular secondary battery 100 can be maintained.

A control valve 11 (safety valve) is provided on the sealing plate 10. If the internal pressure of the battery cell is raised by gas generated by electrolysis of the aqueous solvent, the generated gas can be released from the control valve 11 to the outside. As the control valve 11, for example, a return-type valve that operates when the internal pressure exceeds a set value and functions as a sealing plug when the internal pressure lowers may be used. Alternatively, a non-return-type control valve that does not recover the function as a sealing plug once it operates may be used. In FIG. 1, the control valve 11 is disposed at the center of the sealing plate 10. However, the position of the control valve 11 may be an end of the sealing plate 10. The control valve 11 may be omitted.

Additionally, a liquid pouring port 12 is provided on the sealing plate 10. The aqueous electrolyte may be poured in via the liquid pouring port 12. The liquid pouring port 12 may be closed with a sealing plug 13 after the aqueous electrolyte is poured in. The liquid pouring port 12 and the sealing plug 13 may be omitted.

Figure 3:
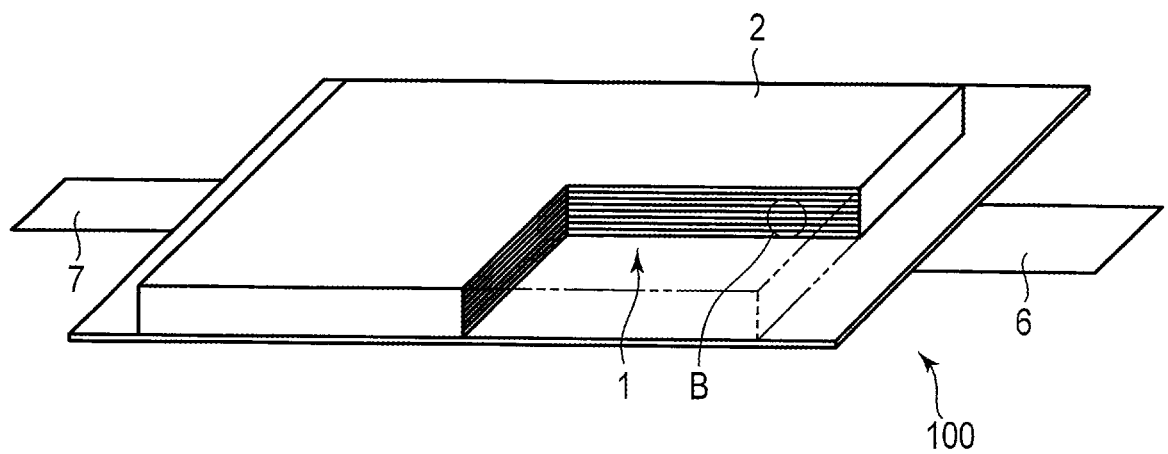
FIG. 3 is a partially cut perspective view schematically showing another example of the secondary battery according to the first embodiment.
Figure 4:
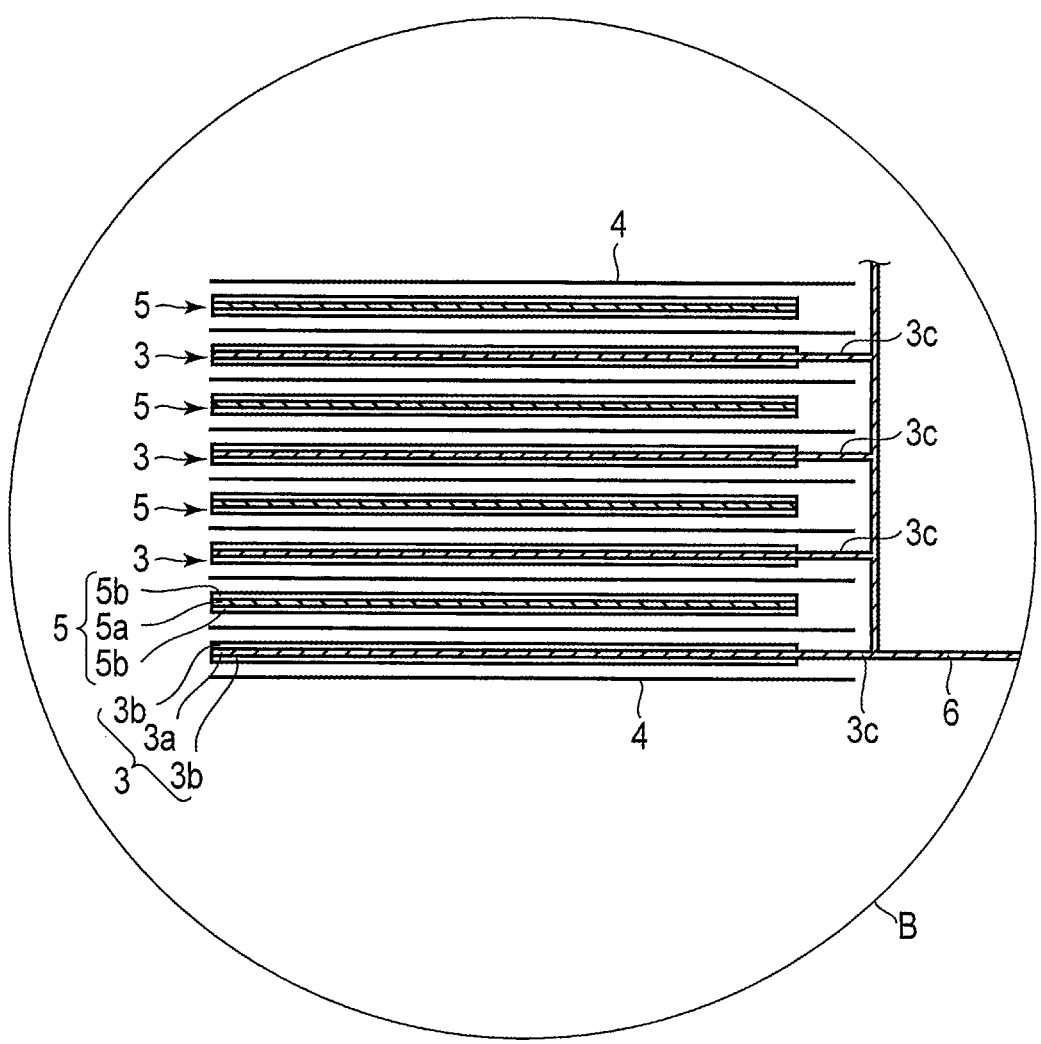
FIG. 4 is an enlarged sectional view showing part B of the secondary battery shown in FIG. 3.

FIG. 3 is a partially cutout perspective view schematically showing another example of the secondary battery according to the first embodiment. FIG. 4 is an enlarged sectional view of section B of the secondary battery shown in FIG. 3. FIGS. 3 and 4 show an example of the secondary battery 100 using a laminated film container member as a container.

The secondary battery 100 shown in FIGS. 3 and 4 includes an electrode group 1 shown in FIGS. 3 and 4, a container member 2 shown in FIG. 3, and first and second electrolytes (not shown). The electrode group 1 and the first and second electrolytes are housed in the container member 2. The first and second electrolytes are held by the electrode group 1.

The container member 2 is made of a laminated film including two resin layers and a metal layer interposed between the resin layers.

As shown in FIG. 4, the electrode group 1 is a stacked electrode group. The stacked electrode group 1 has a structure in which the negative electrode 3 and the positive electrode 5 are alternately stacked with the separator 4 interposed therebetween.

The electrode group 1 includes plural negative electrodes 3. Each of the negative electrodes 3 includes the negative electrode current collector 3a and the negative electrode active material-containing layers 3b supported on both surfaces of the negative electrode current collector 3a. The electrode group 1 further includes plural positive electrodes 5. Each of the positive electrodes 5 includes the positive electrode current collector 5a and the positive electrode active material-containing layers 5b supported on both surfaces of the positive electrode current collector 5a.

The negative electrode current collector 3a of each of the negative electrodes 3 includes at one side a portion where the negative electrode active material-containing layer 3b is not supported on any surface. This portion, that is, the negative electrode tab portion 3c serves as a negative electrode current collecting tab. As shown in FIG. 4, the negative electrode tab portion 3c does not overlap the positive electrode 5. Plural negative electrode tab portions 3c are electrically connected to a strip-shaped negative electrode terminal 6. A leading end of the strip-shaped negative electrode terminal 6 is drawn to the outside of the container member 2.

Although not shown, the positive electrode current collector 5a of each of the positive electrodes 5 includes at one side a portion where the positive electrode active material-containing layer 5b is not supported on any surface. This portion serves as a positive electrode current collecting tab. Like the negative electrode current collecting tab (negative electrode tab portion 3c), the positive electrode current collecting tab does not overlap the negative electrode 3. Further, the positive electrode current collecting tab is located on the opposite side of the electrode group 1 with respect to the negative electrode current collecting tab (negative electrode tab portion 3c). The positive electrode current collecting tab is electrically connected to a strip-shaped positive electrode terminal 7. A leading end of the strip-shaped positive electrode terminal 7 is located on the opposite side of the negative electrode terminal 6 and drawn to the outside of the container member 2.

Figure 5:
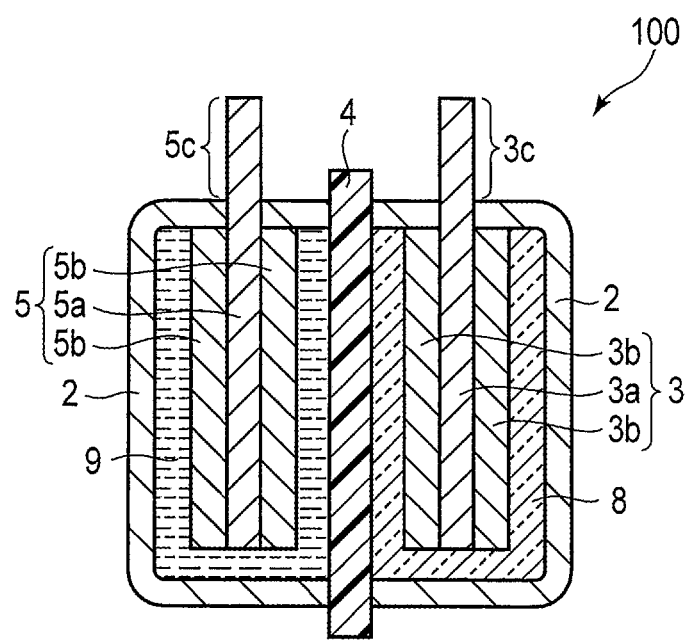
FIG. 5 is a sectional view schematically showing yet another example of the secondary battery according to the first embodiment.

FIG. 5 is a sectional view schematically showing yet another example of the secondary battery according to the embodiment.

The secondary battery 100 shown in FIG. 5 includes a negative electrode 3, a positive electrode 5, a separator 4, a second electrolyte 8, a first electrolyte 9, and a container member 2. The negative electrode 3 includes a negative electrode current collector 3a and a negative electrode active material-containing layer 3b provided on part of both surfaces of the negative electrode current collector 3a. The negative electrode current collector 3a includes a negative electrode tab portion 3c which is not covered with the negative electrode active material-containing layer 3b. The positive electrode 5 includes a positive electrode current collector 5a and a positive electrode active material-containing layer 5b provided on part of both surfaces of the positive electrode current collector 5a. The positive electrode current collector 5a includes a positive electrode tab portion 5c which is not covered with the positive electrode active material-containing layer 5b.

The negative electrode 3 is housed in the container member 2 in a state in which the negative electrode tab portion 3c projects outside. The positive electrode 5 is housed in the container member 2 in a state in which the positive electrode tab portion 5c projects outside. The second electrolyte 8 is housed in the container member 2 such that at least a portion thereof comes into contact with the negative electrode 3. The first electrolyte 9 is housed in the container member 2 such that at least a portion thereof comes into contact with the positive electrode 5.

As an example, FIG. 5 shows the case where the second electrolyte 8 and the first electrolyte 9 are liquid.

As shown in FIG. 5, the separator 4 may extend from the inside to the outside of the container member 2, or may be provided inside the container member 2. In this example, the separator 4 is an ion exchange membrane or a solid electrolyte.

The secondary battery according to the first embodiment includes a negative electrode including a lithium titanium oxide having a degree of proton substitution of 0.01 to 0.2. The negative electrode can suppress the proton substitution reaction that occurs when the negative electrode comes into contact with an electrolyte including water. As a result, an uneven charge-and-discharge reaction due to proton substitution can be reduced, which allows for enhanced discharge capacity and cycle performance of the battery. In addition, the SOC of the negative electrode can be easily estimated.

Second Embodiment

According to a second embodiment, a battery module is provided. The battery module includes a plurality of secondary batteries according to the first embodiment.

In the battery module according to the second embodiment, individual single-batteries may be arranged to be electrically connected in series or in parallel, or may be arranged in combination of in-series connection and in-parallel connection.

Next, an example of the battery module according to the second embodiment will be described with reference to the drawings.

FIG. 6 is a perspective view schematically showing an example of the battery module according to the second embodiment. The battery module 200 shown in FIG. 6 includes five single-batteries 100a to 100e, four bus bars 21, a positive electrode-side lead 22, and a negative electrode-side lead 23. Each of the five single-batteries 100a to 100e is the secondary battery according to the first embodiment.

The bus bar 21 connects, for example, a negative electrode terminal 6 of one single-battery 100a and a positive electrode terminal 7 of the single-battery 100b positioned adjacent to the single-battery 100a. In this way, the five single-batteries 100a to 100e are connected in series by the four bus bars 21. That is, the battery module 200 shown in FIG. 6 is a battery module of five in-series connection.

As shown in FIG. 6, the positive electrode terminal 7 of the single-battery 100a located at the left end among the five single-batteries 100a to 100e is connected to the positive electrode-side lead 22 for external connection. In addition, the negative electrode terminal 6 of the single-battery 100e located at the right end among the five single-batteries 100a to 100e is connected to the negative electrode-side lead 23 for external connection.

The battery module according to the second embodiment includes the secondary battery according to the first embodiment. Therefore, the battery module according to the second embodiment can exhibit both excellent discharge capacity and excellent cycle performance. In addition, the SOC can be easily estimated.

Third Embodiment

According to a third embodiment, a battery pack is provided. The battery pack includes the battery module according to the second embodiment. The battery pack may include a single secondary battery according to the first embodiment, in place of the battery module according to the second embodiment.

The battery pack according to the third embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the third embodiment may further comprise an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of a motive force of vehicles such as automobiles) is provided to the battery pack via the external power distribution terminal.

Next, an example of a battery pack according to the third embodiment will be described with reference to the drawings.

FIG. 7 is an exploded perspective view schematically showing an example of the battery pack according to the third embodiment. FIG. 8 is a block diagram showing an example of an electric circuit of the battery pack shown in FIG. 7.

A battery pack 300 shown in FIGS. 7 and 8 includes a housing container 31, a lid 32, protective sheets 33, a battery module 200, a printed wiring board 34, wires 35, and an insulating plate (not shown).

A housing container 31 shown in FIG. 7 is a bottomed-square-shaped container having a rectangular bottom surface. The housing container 31 is configured to house the protective sheets 33, the battery module 200, the printed wiring board 34, and wires 35. The lid 32 has a rectangular shape. The lid 32 covers the housing container 31 to house the battery module 200 and the like. Although not shown, opening(s) or connection terminal(s) for connecting to external device(s) and the like are provided on the housing container 31 and lid 32.

The battery module 200 includes plural single-batteries 100, a positive electrode-side lead 22, a negative electrode-side lead 23, and adhesive tape(s) 24.

At least one of the plural single-batteries 100 is a secondary battery according to the first embodiment. The plural single-batteries 100 are stacked such that the negative electrode terminals 6 and the positive electrode terminals 7, which extend outside, are directed toward the same direction. The plural single-batteries 100 are electrically connected in series, as shown in FIG. 8. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape(s) 24 fastens the plural single-batteries 100. The plural single-batteries 100 may be fixed using a heat-shrinkable tape in place of the adhesive tape(s) 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural single-batteries 100.

One end of the positive electrode-side lead 22 is connected to the positive electrode terminal 7 of the single-battery 100 located lowermost in the stack of the single-batteries 100. One end of the negative electrode-side lead 23 is connected to the negative electrode terminal 6 of the single-battery 100 located uppermost in the stack of the single-batteries 100.

The printed wiring board 34 is arranged on the inner surface of the housing container 31 along the short side direction. The printed wiring board 34 includes a positive electrode-side connector 341, a negative electrode-side connector 342, a thermistor 343, a protective circuit 344, wirings 345 and 346, an external power distribution terminal 347, a plus-side (positive-side) wire 348a, and a minus-side (negative-side) wire 348b. One principal surface of the printed wiring board 34 faces the surface of the battery module 200 from which the negative electrode terminals 6 and the positive electrode terminals 7 extend out. An insulating plate (not shown) is disposed in between the printed wiring board 34 and the battery module 200.

The positive electrode-side connector 341 is provided with a through hole. By inserting the other end of the positive electrode-side lead 22 into the though hole, the positive electrode-side connector 341 and the positive electrode-side lead 22 become electrically connected. The negative electrode-side connector 342 is provided with a through hole. By inserting the other end of the negative electrode-side lead 23 into the though hole, the negative electrode-side connector 342 and the negative electrode-side lead 23 become electrically connected.

The thermistor 343 is fixed to one principal surface of the printed wiring board 34. The thermistor 343 detects the temperature of each single-battery 100 and transmits detection signals to the protective circuit 344.

The external power distribution terminal 347 is fixed to the other principal surface of the printed wiring board 34. The external power distribution terminal 347 is electrically connected to device(s) that exists outside the battery pack 300.

The protective circuit 344 is fixed to the other principal surface of the printed wiring board 34. The protective circuit 344 is connected to the external power distribution terminal 347 via the plus-side wire 348a. The protective circuit 344 is connected to the external power distribution terminal 347 via the minus-side wire 348b. In addition, the protective circuit 344 is electrically connected to the positive electrode-side connector 341 via the wiring 345. The protective circuit 344 is electrically connected to the negative electrode-side connector 342 via the wiring 346. Furthermore, the protective circuit 344 is electrically connected to each of the plural single-batteries 100 via the wires 35.

The protective sheets 33 are arranged on both inner surfaces of the housing container 31 along the long side direction and on one inner surface of the housing container 31 along the short side direction facing the printed wiring board 34 through the battery module 200. The protective sheets 33 are made of, for example, resin or rubber.

The protective circuit 344 controls charge and discharge of the plural single-batteries 100. The protective circuit 344 is also configured to cut-off electric connection between the protective circuit 344 and the external power distribution terminal 347, based on detection signals transmitted from the thermistor 343 or detection signals transmitted from each single-battery 100 or the battery module 200.

An example of the detection signal transmitted from the thermistor 343 is a signal indicating that the temperature of a single-battery (or single-batteries) 100 is detected to be a predetermined temperature or more. An example of the detection signal transmitted from each single-battery 100 or the battery module 200 is a signal indicating detection of over-charge, over-discharge, and overcurrent of the single-battery (or single-batteries) 100. When detecting over-charge or the like for each of the single-batteries 100, the battery voltage may be detected, or a positive electrode potential or negative electrode potential may be detected. In the latter case, a lithium electrode to be used as a reference electrode may be inserted into each single-battery 100.

Note, that as the protective circuit 344, a circuit included in a device (for example, an electronic device or an automobile) that uses the battery pack 300 as a power source may be used.

As described above, the battery pack 300 includes the external power distribution terminal 347. Hence, the battery pack 300 can output current from the battery module 200 to an external device and input current from an external device to the battery module 200, via the external power distribution terminal 347. In other words, when using the battery pack 300 as a power source, the current from the battery module 200 is supplied to an external device via the external power distribution terminal 347. When charging the battery pack 300, a charge current from an external device is supplied to the battery pack 300 via the external power distribution terminal 347. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may be used as the external power distribution terminal.

Such a battery pack is used for, for example, an application having a demand of being excellent in cycle performance when a large current is extracted. More specifically, the battery pack is used as, for example, a power source for electronic devices, a stationary battery, or an onboard battery for various kinds of vehicles. An example of the electronic device is a digital camera. The battery pack is particularly favorably used as an onboard battery.

The battery pack according to the third embodiment includes the secondary battery according to the first embodiment or the battery module according to the second embodiment. Therefore, the battery pack according to the third embodiment can exhibit both excellent discharge capacity and excellent cycle performance. In addition, the SOC can be easily estimated.

Fourth Embodiment

According to a fourth embodiment, a vehicle is provided. The vehicle includes the battery pack according to the third embodiment.

In a vehicle according to the fourth embodiment, the battery pack is configured, for example, to recover regenerative energy from motive force of the vehicle. The vehicle according to the fourth embodiment includes a mechanism for converting kinetic energy of the vehicle into regenerative energy.

Examples of the vehicle according to the fourth embodiment include two- to four-wheeled hybrid electric automobiles, two- to four-wheeled electric automobiles, power assisted bicycles, and railway cars.

In the vehicle according to the fourth embodiment, the installing position of the battery pack is not particularly limited. For example, the battery pack may be installed in the engine compartment of the vehicle, in rear parts of the vehicle, or under seats.

The vehicle according to the fourth embodiment may be equipped with plural battery packs. In such a case, the battery packs may be electrically connected in series, in parallel, or in a combination of in series connection and in parallel connection.

Next, an example of the vehicle according to the fourth embodiment will be described with reference to the drawings.

FIG. 9 is a sectional view schematically showing an example of a vehicle according to the fourth embodiment.

The vehicle 400 shown in FIG. 9 includes a vehicle body 40 and a battery pack 300 according to the third embodiment. The vehicle 400 shown in FIG. 9 is a four-wheeled automobile.

This vehicle 400 may have plural battery packs 300 installed. In such a case, the battery packs 300 may be connected in series, connected in parallel, or connected in a combination of in-series connection and in-parallel connection.

In FIG. 9, the battery pack 300 is installed in an engine compartment located at the front of the vehicle body 40. As described above, the battery pack 300 may be installed in rear sections of the vehicle body 40, or under a seat. The battery pack 300 may be used as a power source of the vehicle 400. In addition, the battery pack 300 can recover regenerative energy of a motive force of the vehicle 400.

The vehicle according to the fourth embodiment is equipped with the battery pack according to the third embodiment. Since the battery pack can exhibit excellent charge-and-discharge performance, a high-performance vehicle can be achieved. Additionally, since the battery pack can exhibit excellent cycle performance, vehicle reliability is high.

Fifth Embodiment

According to a fifth embodiment, a stationary power supply is provided. The stationary power supply includes a battery pack according to the third embodiment. Note that instead of a battery pack according to the third embodiment, the stationary power supply may have a battery module according to the second embodiment or a secondary battery according to the first embodiment installed therein.

The stationary power supply according to the fifth embodiment includes a battery pack according to the third embodiment. Therefore, the stationary power supply according to the fifth embodiment can exhibit excellent charge and discharge performance and excellent cycle performance.

FIG. 10 is a block diagram showing an example of a system including a stationary power supply according to the fifth embodiment. FIG. 10 is a diagram showing an application example to stationary power supplies 112, 123 as an example of use of battery packs 300A, 300B according to the third embodiment. In the example shown in FIG. 10, a system 110 in which the stationary power supplies 112, 123 are used is shown. The system 110 includes an electric power plant 111, the stationary power supply 112, a customer side electric power system 113, and an energy management system (EMS) 115. Also, an electric power network 116 and a communication network 117 are formed in the system 110, and the electric power plant 111, the stationary power supply 112, the customer side electric power system 113 and the EMS 115 are connected via the electric power network 116 and the communication network 117. The EMS 115 performs control to stabilize the entire system 110 by utilizing the electric power network 116 and the communication network 117.

The electric power plant 111 generates a large amount of electric power from fuel sources such as thermal power or nuclear power. Electric power is supplied from the electric power plant 111 through the electric power network 116 and the like. In addition, the battery pack 300A is installed in the stationary power supply 112. The battery pack 300A can store electric power and the like supplied from the electric power plant 111. In addition, the stationary power supply 112 can supply the electric power stored in the battery pack 300A through the electric power network 116 and the like. The system 110 is provided with an electric power converter 118. The electric power converter 118 includes a converter, an inverter, a transformer and the like. Thus, the electric power converter 118 can perform conversion between direct current (DC) and alternate current (AC), conversion between alternate currents of frequencies different from each other, voltage transformation (step-up and step-down) and the like. Therefore, the electric power converter 118 can convert electric power from the electric power plant 111 into electric power that can be stored in the battery pack 300A.

The customer side electric power system 113 includes an electric power system for factories, an electric power system for buildings, an electric power system for home use and the like. The customer side electric power system 113 includes a customer side EMS 121, an electric power converter 122, and the stationary power supply 123. The battery pack 300B is installed in the stationary power supply 123. The customer side EMS 121 performs control to stabilize the customer side electric power system 113.

Electric power from the electric power plant 111 and electric power from the battery pack 300A are supplied to the customer side electric power system 113 through the electric power network 116. The battery pack 300B can store electric power supplied to the customer side electric power system 113. Similarly to the electric power converter 118, the electric power converter 122 includes a converter, an inverter, a transformer and the like. Thus, the electric power converter 122 can perform conversion between direct current and alternate current, conversion between alternate currents of frequencies different from each other, voltage transformation (step-up and step-down) and the like. Therefore, the electric power converter 122 can convert electric power supplied to the customer side electric power system 113 into electric power that can be stored in the battery pack 300B.

Note that the electric power stored in the battery pack 300B can be used, for example, for charging a vehicle such as an electric automobile. Also, the system 110 may be provided with a natural energy source. In such a case, the natural energy source generates electric power by natural energy such as wind power and solar light. In addition to the electric power plant 111, electric power is also supplied from the natural energy source through the electric power network 116.

EXAMPLES

Examples will be described below; however, the embodiments are not limited to those examples.

Example 1

Proton Substitution Treatment $Li_4Ti_5O_{12}$ particles having a spinel crystal structure and an average secondary particle size (diameter) of 15 μm were immersed in an aqueous solution of $CH_3COOH$ having a concentration of 0.1 mol/L for 12 hours. The temperature of the aqueous solution was 25° C. The pH of the aqueous solution is shown in Table 1. The immersion treatment was performed in an inert gas atmosphere. After the immersion treatment was performed, the particles were washed with water and dried, whereby lithium titanium oxide particles having a degree of proton substitution of 0.01 were obtained. The degree of proton substitution was measured by the method described above. FIG. 11 shows a powder X-ray diffraction pattern obtained after heating the lithium titanium oxide particles of Example 1 at 450° C. for 24 hours.

The lithium titanium oxide particles having a degree of proton substitution of 0.01 obtained as a negative electrode active material, a graphite powder as a conductive agent, and polyacrylimide (PAI) as a binder were blended in proportions of 80% by weight, 10% by weight, and 10% by weight, respectively, and the blended negative electrode active material, conductive agent, and binder were dispersed in a solvent of N-methylpyrrolidone (NMP), whereby a slurry was prepared. A zinc foil having a thickness of 50 μm was used as a negative electrode current collector. The slurry thus prepared was applied onto the zinc foil, and the applied slurry was dried, whereby a negative electrode active material-containing layer was formed. Then, the negative electrode current collector and the negative electrode active material-containing layer were subjected to pressing, whereby a negative electrode was formed. In the negative electrode thus formed, the electrode density of the portion other than the negative electrode current collector was 2.0 g/cm$^3$.

To form a positive electrode active material-containing layer, a lithium manganese oxide ($LiMn_2O_4$) having a spinel structure and an average particle size of 10 μm as a positive electrode active material, a graphite powder as a conductive agent, and polyacrylimide (PAI) as a binder were used. Then, a positive electrode active material, a conductive agent, and a binder were blended in proportions of 80% by weight, 10% by weight, and 10% by weight, respectively, and the blended positive electrode active material, conductive agent, and binder were dispersed in a solvent of N-methylpyrrolidone (NMP), whereby a slurry was prepared. A titanium foil having a thickness of 12 μm was used as a positive electrode current collector. The slurry thus prepared was applied onto the titanium foil, and the applied slurry was dried, whereby a positive electrode active material-containing layer was formed. Then, the positive electrode current collector and the positive electrode active material-containing layer were subjected to pressing, whereby a positive electrode was formed. In the positive electrode thus formed, the electrode density of the portion other than the positive electrode current collector was 3.0 g/cm$^3$.

A solid electrolyte composite membrane including LATP ($Li_{1.3}Al_{0.3}Ti_{1.7}(PO_4)_3$) powder having a median diameter D50 of 1 μm and lithium-ion conductivity, and PVB (polyvinyl butyral) at a weight ratio of 9:1 was used as a separator.

The positive electrode and the negative electrode were alternately stacked with the separator interposed therebetween, whereby a flat electrode group was formed. The electrode group thus formed was housed in a storage space of a container member. A thin metal container formed of stainless steel was used as the container member. A container having a wall thickness of 0.25 mm was used as the metal container. With the electrode group housed in the storage space of the container member, an aqueous electrolyte was poured into the container member and the container member was sealed, whereby a secondary battery was obtained. An aqueous solution of LiCl having a LiCl concentration of 9 mol/L, a water concentration of 45 mol/L, and a pH of 7 was used as the aqueous electrolyte. The aqueous electrolyte was used for both the first electrolyte as a positive electrode-side electrolytic solution, and the second electrolyte as a negative electrode-side electrolytic solution. The salt concentration, water concentration, and pH of the aqueous electrolyte were measured by the method described above.

Examples 2 to 6

Lithium titanium oxide particles having a degree of proton substitution of 0.01 were obtained in the same manner as described in Example 1, except that the type of acid, concentration and pH of the acidic aqueous solution used in the proton substitution treatment, the temperature of the aqueous solution at the time of the immersion treatment, and the immersion treatment time were changed as shown in Table 1.

A secondary battery was produced in the same manner as described in Example 1, except that the resultant lithium titanium oxide particles were used as a negative electrode active material.

Examples 7 to 14

Lithium titanium oxide particles having a degree of proton substitution of the value shown in Table 1 below were obtained in the same manner as described in Example 1, except that the type of acid, concentration and pH of the acidic aqueous solution used in the proton substitution treatment, the temperature of the aqueous solution at the time of the immersion treatment, and the immersion treatment time were changed as shown in Table 1.

A secondary battery was produced in the same manner as described in Example 1, except that the resultant lithium titanium oxide particles were used as a negative electrode active material.

Examples 15 to 23

Lithium titanium oxide particles having a degree of proton substitution of the value shown in Table 1 below were obtained in the same manner as described in Example 1, except that the type of acid, concentration and pH of the acidic aqueous solution used in the proton substitution treatment, the temperature of the aqueous solution at the time of the immersion treatment, and the immersion treatment time were changed as shown in Table 1.

Electrolytic solutions having the same composition were used as the first electrolyte and the second electrolyte, respectively. The type of lithium salt used in the electrolytic solution, the lithium salt concentration, the water concentration, and the pH are shown in Tables 3 and 5 below.

A secondary battery was produced in the same manner as described in Example 1, except that the resultant lithium titanium oxide particles were used as a negative electrode active material and the composition of the electrolytic solution as an aqueous electrolyte was changed as described above.

Examples 24 to 46

Lithium titanium oxide particles having a degree of proton substitution of the value shown in Tables 1 and 2 below were obtained in the same manner as described in Example 1, except that the type of acid, concentration and pH of the acidic aqueous solution used in the proton substitution treatment, the temperature of the aqueous solution at the time of the immersion treatment, and the immersion treatment time were changed as shown in Tables 1 and 2.

Electrolytic solutions having the same composition were used as the first electrolyte and the second electrolyte, respectively. The electrolytic solutions used in Examples 24 to 28 were made by adding HCl as a pH adjuster to an aqueous solution of LiCl. The electrolytic solutions used in Examples 29 to 37 were made by adding LiOH as a pH adjuster to an aqueous solution of LiCl. The electrolytic solutions used in Examples 38 to 46 were made by adding LiOH as a pH adjuster to an aqueous solution of LiTFSI. The type of lithium salt contained in each electrolytic solution, the lithium salt concentration, the water concentration, the pH, and the type of pH adjuster are shown in Tables 3 to 6 below.

A secondary battery was produced in the same manner as described in Example 1, except that the resultant lithium titanium oxide particles were used as a negative electrode active material and the composition of the electrolytic solution as an aqueous electrolyte was changed as described above.

Example 47

Production of Negative Electrode

Lithium titanium oxide particles having a degree of proton substitution of the value shown in Table 2 below were obtained in the same manner as described in Example 1, except that the type of acid, concentration and pH of the acidic aqueous solution used in the proton substitution treatment, the temperature of the aqueous solution at the time of the immersion treatment, and the immersion treatment time were changed as shown in Table 2.

A negative electrode was produced in the same manner as described in Example 1, except that the resultant lithium titanium oxide particles were used as a negative electrode active material and the negative electrode was punched into a circular shape with a diameter of 10 mm.

Production of Positive Electrode

A positive electrode produced in the same manner as described in Example 1 was punched into a circular shape with a diameter of 10 mm.

Preparation of First Electrolyte

An aqueous solution of LiCl having a LiCl concentration of 9 mol/L, a water concentration of 45 mol/L, and a pH of 7 was prepared as the first electrolyte.

Preparation of Second Electrolyte

An electrolyte made by adding LiOH as a pH adjuster to an aqueous solution of LiCl was prepared as the second electrolyte. The type of lithium salt contained in the electrolytic solution, the lithium salt concentration, the water concentration, and the pH are shown in Table 4.

Production of Secondary Battery

A negative electrode lead was fixed onto a plastic plate, and the negative electrode was fixed onto the negative electrode lead. A positive electrode lead was fixed onto another plastic plate, and the positive electrode was fixed onto the positive electrode lead. The second electrolyte prepared above was dropped onto the negative electrode, and a solid electrolyte membrane of LATP ($Li_{1.3}Al_{0.3}Ti_{1.7}(PO_4)_3$) was placed thereon and brought into close contact therewith. The first electrolyte was dropped onto the reverse side of the same LATP membrane, and the positive electrode was placed thereon, brought into close contact therewith and further fixed with screws. A secondary battery was produced as described above.

Examples 48 to 66

A secondary battery was produced in the same manner as described in Example 47, except that the type of acid, concentration and pH of the acidic aqueous solution used in the proton substitution treatment, the temperature of the aqueous solution at the time of the immersion treatment, the immersion treatment time, the degree of proton substitution, and the type of lithium salt, lithium salt concentration, water concentration, pH, and type of pH adjuster in each of the first electrolyte and the second electrolyte were set as shown in Tables 2, 4 and 6 below. When no pH adjuster was used, a symbol "-" is indicated in the column in the tables.

Comparative Examples 1 and 2

Lithium titanium oxide particles having a degree of proton substitution of the value shown in Table 2 below were obtained in the same manner as described in Example 1, except that the type of acid, concentration and pH of the acidic aqueous solution used in the proton substitution treatment, the temperature of the aqueous solution at the time of the immersion treatment, and the immersion treatment time were changed as shown in Table 2.

A secondary battery was produced in the same manner as described in Example 1, except that the resultant lithium titanium oxide particles were used as a negative electrode active material.

A cycle performance test and measurement of slopes of charge and discharge curves of the secondary batteries of the Examples and the Comparative Examples obtained were performed by the method described below. A weight of the negative electrode active material (lithium titanium oxide) included in the negative electrode was obtained, and a negative electrode capacity was obtained on the assumption that a theoretical capacity of a lithium titanium oxide was 174 mAh/g and used for negative electrode active material conversion. The results thereof are shown in Tables 7 and 8.

<Discharge Capacity Measurement>

CCCV charge (constant-current constant-voltage charge) was performed at a 0.5 C rate in terms of negative electrode active material conversion, and charge was performed at 2.7 V until the current value became 0.25 C. CC discharge (constant current discharge) was performed at a 0.5 C rate in terms of negative electrode active material conversion, and discharge was performed until the voltage became 2.1 V, to measure the discharge capacity. In addition, the values of the discharge capacity after 20 cycles were considered as the discharge capacity of the Examples and the Comparative Examples.

<Cycle Performance Test>

A charge-and-discharge cycle for performing charge and discharge was performed at a 0.5 C rate respectively, and the number of cycles performed until the discharge capacity became 80% with respect to the initial discharge capacity was determined as cycle performance.

<Slopes of Charge and Discharge Curves>

The potential difference at the time of SOC being 10% and at the time of SOC being 50% observed when the charging was performed at a 0.5 C (in terms of negative electrode active material conversion) rate was determined as slopes of the charge and discharge curves.

TABLE 1

| | Conditions of Proton Substitution | | | | Degree of Proton Substitution |
|---|---|---|---|---|---|
| | Solution | Solution pH | Temperature (° C.) | Time (hour) | |
| Example 1 | CH$_3$COOH 0.1 mol/L | 2.8 | 25 | 12 | 0.01 |
| Example 2 | HCl 1 × 10$^{-6}$ mol/L | 6 | 25 | 6 | 0.01 |
| Example 3 | H$_2$SO$_4$ 1 × 10$^{-6}$ mol/L | 5.7 | 25 | 3 | 0.01 |
| Example 4 | CH$_3$COOH 0.1 mol/L | 2.8 | 45 | 3 | 0.01 |
| Example 5 | HCl 1 × 10$^{-6}$ mol/L | 6 | 45 | 1.5 | 0.01 |
| Example 6 | CH$_3$COOH 0.1 mol/L | 2.8 | 60 | 1 | 0.01 |
| Example 7 | CH$_3$COOH 0.1 mol/L | 2.8 | 45 | 12 | 0.05 |
| Example 8 | HCl 1 × 10$^{-4}$ mol/L | 4 | 25 | 8 | 0.05 |
| Example 9 | H$_2$SO$_4$ 1 × 10$^{-4}$ mol/L | 3.7 | 25 | 8 | 0.05 |
| Example 10 | HCl 1 × 10$^{-3}$ mol/L | 3 | 25 | 24 | 0.1 |
| Example 11 | H$_2$SO$_4$ 1 × 10$^{-3}$ mol/L | 2.7 | 25 | 12 | 0.1 |
| Example 12 | HCl 1 × 10$^{-2}$ mol/L | 2 | 45 | 24 | 0.2 |
| Example 13 | H$_2$SO$_4$ 1 × 10$^{-2}$ mol/L | 1.7 | 45 | 12 | 0.2 |
| Example 14 | HNO$_3$ 1 × 10$^{-2}$ mol/L | 2 | 45 | 24 | 0.2 |
| Example 15 | HCl 1 × 10$^{-6}$ mol/L | 6 | 25 | 6 | 0.01 |
| Example 16 | CH$_3$COOH 0.1 mol/L | 2.8 | 45 | 12 | 0.05 |
| Example 17 | H$_2$SO$_4$ 1 × 10$^{-3}$ mol/L | 2.7 | 25 | 12 | 0.1 |
| Example 18 | HCl 1 × 10$^{-6}$ mol/L | 6 | 25 | 6 | 0.01 |
| Example 19 | CH$_3$COOH 0.1 mol/L | 2.8 | 45 | 12 | 0.05 |
| Example 20 | H$_2$SO$_4$ 1 × 10$^{-3}$ mol/L | 2.8 | 25 | 12 | 0.1 |
| Example 21 | HCl 1 × 10$^{-6}$ mol/L | 6 | 25 | 6 | 0.01 |
| Example 22 | CH$_3$COOH 0.1 mol/L | 2.8 | 45 | 12 | 0.05 |
| Example 23 | H$_2$SO$_4$ 1 × 10$^{-3}$ mol/L | 3 | 25 | 12 | 0.1 |
| Example 24 | HCl 1 × 10$^{-6}$ mol/L | 6 | 25 | 6 | 0.01 |
| Example 25 | HCl 1 × 10$^{-6}$ mol/L | 6 | 25 | 6 | 0.01 |
| Example 26 | H$_2$SO$_4$ 1 × 10$^{-3}$ mol/L | 2.8 | 25 | 12 | 0.1 |
| Example 27 | H$_2$SO$_4$ 1 × 10$^{-3}$ mol/L | 2.8 | 25 | 12 | 0.1 |
| Example 28 | CH$_3$COOH 0.1 mol/L | 2.8 | 45 | 3 | 0.01 |
| Example 29 | HCl 1 × 10$^{-6}$ mol/L | 6 | 25 | 6 | 0.01 |
| Example 30 | HCl 1 × 10$^{-6}$ mol/L | 6 | 25 | 6 | 0.01 |
| Example 31 | HCl 1 × 10$^{-6}$ mol/L | 6 | 25 | 6 | 0.01 |
| Example 32 | H$_2$SO$_4$ 1 × 10$^{-3}$ mol/L | 2.8 | 25 | 12 | 0.1 |
| Example 33 | H$_2$SO$_4$ 1 × 10$^{-3}$ mol/L | 2.8 | 25 | 12 | 0.1 |
| Example 34 | H$_2$SO$_4$ 1 × 10$^{-3}$ mol/L | 2.8 | 25 | 12 | 0.1 |

TABLE 2

| | Conditions of Proton Substitution | | | | Degree of Proton Substitution |
|---|---|---|---|---|---|
| | Solution | Solution pH | Temperature (° C.) | Time (hour) | |
| Example 35 | CH$_3$COOH 0.1 mol/L | 2.8 | 45 | 3 | 0.01 |
| Example 36 | CH$_3$COOH 0.1 mol/L | 2.8 | 45 | 3 | 0.01 |
| Example 37 | CH$_3$COOH 0.1 mol/L | 2.8 | 45 | 3 | 0.01 |
| Example 38 | HCl 1 × 10$^{-6}$ mol/L | 6 | 25 | 6 | 0.01 |
| Example 39 | HCl 1 × 10$^{-6}$ mol/L | 6 | 25 | 6 | 0.01 |
| Example 40 | HCl 1 × 10$^{-6}$ mol/L | 6 | 25 | 6 | 0.01 |

TABLE 2-continued

| | Conditions of Proton Substitution | | | | Degree of Proton Substitution |
|---|---|---|---|---|---|
| | Solution | Solution pH | Temperature (° C.) | Time (hour) | |
| Example 41 | $H_2SO_4$ 1 × $10^{-3}$ mol/L | 2.8 | 25 | 12 | 0.1 |
| Example 42 | $H_2SO_4$ 1 × $10^{-3}$ mol/L | 2.8 | 25 | 12 | 0.1 |
| Example 43 | $H_2SO_4$ 1 × $10^{-3}$ mol/L | 2.8 | 25 | 12 | 0.1 |
| Example 44 | $CH_3COOH$ 0.1 mol/L | 2.8 | 45 | 3 | 0.01 |
| Example 45 | $CH_3COOH$ 0.1 mol/L | 2.8 | 45 | 3 | 0.01 |
| Example 46 | $CH_3COOH$ 0.1 mol/L | 2.8 | 45 | 3 | 0.01 |
| Example 47 | HCl 1 × $10^{-6}$ mol/L | 6 | 25 | 6 | 0.01 |
| Example 48 | HCl 1 × $10^{-6}$ mol/L | 6 | 25 | 6 | 0.01 |
| Example 49 | HCl 1 × $10^{-6}$ mol/L | 6 | 25 | 6 | 0.01 |
| Example 50 | $H_2SO_4$ 1 × $10^{-3}$ mol/L | 3 | 25 | 12 | 0.1 |
| Example 51 | $H_2SO_4$ 1 × $10^{-3}$ mol/L | 3 | 25 | 12 | 0.1 |
| Example 52 | $H_2SO_4$ 1 × $10^{-3}$ mol/L | 3 | 25 | 12 | 0.1 |
| Example 53 | $CH_3COOH$ 0.1 mol/L | 2.8 | 45 | 3 | 0.01 |
| Example 54 | $CH_3COOH$ 0.1 mol/L | 2.8 | 45 | 3 | 0.01 |
| Example 55 | $CH_3COOH$ 0.1 mol/L | 2.8 | 45 | 3 | 0.01 |
| Example 56 | HCl 1 × $10^{-6}$ mol/L | 6 | 25 | 6 | 0.01 |
| Example 57 | HCl 1 × $10^{-6}$ mol/L | 6 | 25 | 6 | 0.01 |
| Example 58 | HCl 1 × $10^{-6}$ mol/L | 6 | 25 | 6 | 0.01 |
| Example 59 | $H_2SO_4$ 1 × $10^{-3}$ mol/L | 2.8 | 25 | 12 | 0.1 |
| Example 60 | $H_2SO_4$ 1 × $10^{-3}$ mol/L | 2.8 | 25 | 12 | 0.1 |
| Example 61 | $H_2SO_4$ 1 × $10^{-3}$ mol/L | 2.8 | 25 | 12 | 0.1 |
| Example 62 | $CH_3COOH$ 0.1 mol/L | 2.8 | 45 | 3 | 0.01 |
| Example 63 | $CH_3COOH$ 0.1 mol/L | 2.8 | 45 | 3 | 0.01 |
| Example 64 | $CH_3COOH$ 0.1 mol/L | 2.8 | 45 | 3 | 0.01 |
| Example 65 | HCl 1 × $10^{-6}$ mol/L | 6 | 25 | 6 | 0.01 |
| Example 66 | HCl 1 × $10^{-6}$ mol/L | 6 | 25 | 6 | 0.01 |
| Comparative Example 1 | $CH_3COOH$ 0.1 mol/L | 2.8 | 25 | 3 | 0.001 |
| Comparative Example 2 | HCl 1 × $10^{-1}$ mol/L | 1 | 25 | 24 | 0.23 |

TABLE 3

| | Electrolytic Solution of Negative Electrode | | | |
|---|---|---|---|---|
| | Salt | pH | Water Concentration | pH Adjuster |
| Example 1 | LiCl_9 mol/L | 7 | 45 mol/L | — |
| Example 2 | LiCl_9 mol/L | 7 | 45 mol/L | — |
| Example 3 | LiCl_9 mol/L | 7 | 45 mol/L | — |
| Example 4 | LiCl_9 mol/L | 7 | 45 mol/L | — |
| Example 5 | LiCl_9 mol/L | 7 | 45 mol/L | — |
| Example 6 | LiCl_9 mol/L | 7 | 45 mol/L | — |
| Example 7 | LiCl_9 mol/L | 7 | 45 mol/L | — |
| Example 8 | LiCl_9 mol/L | 7 | 45 mol/L | — |
| Example 9 | LiCl_9 mol/L | 7 | 45 mol/L | — |
| Example 10 | LiCl_9 mol/L | 7 | 45 mol/L | — |
| Example 11 | LiCl_9 mol/L | 7 | 45 mol/L | — |
| Example 12 | LiCl_9 mol/L | 7 | 45 mol/L | — |
| Example 13 | LiCl_9 mol/L | 7 | 45 mol/L | — |
| Example 14 | LiCl_9 mol/L | 7 | 45 mol/L | — |
| Example 15 | LiCl_12 mol/L | 7 | 42 mol/L | — |
| Example 16 | LiCl_12 mol/L | 7 | 42 mol/L | — |
| Example 17 | LiCl_12 mol/L | 7 | 42 mol/L | — |
| Example 18 | LiTFSI_5 mol/L | 6.6 | 14 mol/L | — |
| Example 19 | LiTFSI_5 mol/L | 6.6 | 14 mol/L | — |
| Example 20 | LiTFSI_5 mol/L | 6.6 | 14 mol/L | — |
| Example 21 | LiFSI_8 mol/L | 3 | 10 mol/L | — |
| Example 22 | LiFSI_8 mol/L | 3 | 10 mol/L | — |
| Example 23 | LiFSI_8 mol/L | 3 | 10 mol/L | — |
| Example 24 | LiCl_9 mol/L | 6 | 45 mol/L | HCl |
| Example 25 | LiCl_9 mol/L | 4 | 45 mol/L | HCl |
| Example 26 | LiCl_9 mol/L | 6 | 45 mol/L | HCl |
| Example 27 | LiCl_9 mol/L | 4 | 45 mol/L | HCl |
| Example 28 | LiCl_9 mol/L | 6 | 45 mol/L | HCl |
| Example 29 | LiCl_9 mol/L | 8 | 45 mol/L | LiOH |
| Example 30 | LiCl_9 mol/L | 12 | 45 mol/L | LiOH |
| Example 31 | LiCl_9 mol/L | 14 | 45 mol/L | LiOH |
| Example 32 | LiCl_9 mol/L | 8 | 45 mol/L | LiOH |
| Example 33 | LiCl_9 mol/L | 12 | 45 mol/L | LiOH |
| Example 34 | LiCl_9 mol/L | 14 | 45 mol/L | LiOH |

TABLE 4

| | Electrolytic Solution of Negative Electrode | | | |
|---|---|---|---|---|
| | Salt | pH | Water Concentration | pH Adjuster |
| Example 35 | LiCl_9 mol/L | 8 | 45 mol/L | LiOH |
| Example 36 | LiCl_9 mol/L | 12 | 45 mol/L | LiOH |
| Example 37 | LiCl_9 mol/L | 14 | 45 mol/L | LiOH |
| Example 38 | LiTFSI_5 mol/L | 8 | 14 mol/L | LiOH |
| Example 39 | LiTFSI_5 mol/L | 12 | 14 mol/L | LiOH |
| Example 40 | LiTFSI_5 mol/L | 14 | 14 mol/L | LiOH |
| Example 41 | LiTFSI_5 mol/L | 8 | 14 mol/L | LiOH |
| Example 42 | LiTFSI_5 mol/L | 12 | 14 mol/L | LiOH |
| Example 43 | LiTFSI_5 mol/L | 14 | 14 mol/L | LiOH |
| Example 44 | LiTFSI_5 mol/L | 8 | 14 mol/L | LiOH |
| Example 45 | LiTFSI_5 mol/L | 12 | 14 mol/L | LiOH |
| Example 46 | LiTFSI_5 mol/L | 14 | 14 mol/L | LiOH |
| Example 47 | LiCl_9 mol/L | 8 | 45 mol/L | LiOH |
| Example 48 | LiCl_9 mol/L | 12 | 45 mol/L | LiOH |
| Example 49 | LiCl_9 mol/L | 14 | 45 mol/L | LiOH |
| Example 50 | LiCl_9 mol/L | 8 | 45 mol/L | LiOH |
| Example 51 | LiCl_9 mol/L | 12 | 45 mol/L | LiOH |
| Example 52 | LiCl_9 mol/L | 14 | 45 mol/L | LiOH |
| Example 53 | LiCl_9 mol/L | 8 | 45 mol/L | LiOH |
| Example 54 | LiCl_9 mol/L | 12 | 45 mol/L | LiOH |
| Example 55 | LiCl_9 mol/L | 14 | 45 mol/L | LiOH |
| Example 56 | LiTFSI_5 mol/L | 8 | 14 mol/L | LiOH |

TABLE 4-continued

Electrolytic Solution of Negative Electrode

| | Salt | pH | Water Concentration | pH Adjuster |
|---|---|---|---|---|
| Example 57 | LiTFSI_5 mol/L | 12 | 14 mol/L | LiOH |
| Example 58 | LiTFSI_5 mol/L | 14 | 14 mol/L | LiOH |
| Example 59 | LiTFSI_5 mol/L | 8 | 14 mol/L | LiOH |
| Example 60 | LiTFSI_5 mol/L | 12 | 14 mol/L | LiOH |
| Example 61 | LiTFSI_5 mol/L | 14 | 14 mol/L | LiOH |
| Example 62 | LiTFSI_5 mol/L | 8 | 14 mol/L | LiOH |
| Example 63 | LiTFSI_5 mol/L | 12 | 14 mol/L | LiOH |
| Example 64 | LiTFSI_5 mol/L | 14 | 14 mol/L | LiOH |
| Example 65 | LiCl_9 mol/L | 8 | 45 mol/L | LiOH |
| Example 66 | LiCl_9 mol/L | 12 | 45 mol/L | LiOH |
| Comparative Example 1 | LiCl_9 mol/L | 7 | 45 mol/L | — |
| Comparative Example 2 | LiCl_9 mol/L | 7 | 45 mol/L | — |

TABLE 5

Electrolytic Solution of Positive Electrode

| | Salt | pH | Water Concentration | pH Adjuster |
|---|---|---|---|---|
| Example 1 | LiCl_9 mol/L | 7 | 45 mol/L | — |
| Example 2 | LiCl_9 mol/L | 7 | 45 mol/L | — |
| Example 3 | LiCl_9 mol/L | 7 | 45 mol/L | — |
| Example 4 | LiCl_9 mol/L | 7 | 45 mol/L | — |
| Example 5 | LiCl_9 mol/L | 7 | 45 mol/L | — |
| Example 6 | LiCl_9 mol/L | 7 | 45 mol/L | — |
| Example 7 | LiCl_9 mol/L | 7 | 45 mol/L | — |
| Example 8 | LiCl_9 mol/L | 7 | 45 mol/L | — |
| Example 9 | LiCl_9 mol/L | 7 | 45 mol/L | — |
| Example 10 | LiCl_9 mol/L | 7 | 45 mol/L | — |
| Example 11 | LiCl_9 mol/L | 7 | 45 mol/L | — |
| Example 12 | LiCl_9 mol/L | 7 | 45 mol/L | — |
| Example 13 | LiCl_9 mol/L | 7 | 45 mol/L | — |
| Example 14 | LiCl_9 mol/L | 7 | 45 mol/L | — |
| Example 15 | LiCl_12 mol/L | 7 | 42 mol/L | — |
| Example 16 | LiCl_12 mol/L | 7 | 42 mol/L | — |
| Example 17 | LiCl_12 mol/L | 7 | 42 mol/L | — |
| Example 18 | LiTFSI_5 mol/L | 6.6 | 14 mol/L | — |
| Example 19 | LiTFSI_5 mol/L | 6.6 | 14 mol/L | — |
| Example 20 | LiTFSI_5 mol/L | 6.6 | 14 mol/L | — |
| Example 21 | LiFSI_8 mol/L | 3 | 10 mol/L | — |
| Example 22 | LiFSI_8 mol/L | 3 | 10 mol/L | — |
| Example 23 | LiFSI_8 mol/L | 3 | 10 mol/L | — |
| Example 24 | LiCl_9 mol/L | 6 | 45 mol/L | HCl |
| Example 25 | LiCl_9 mol/L | 4 | 45 mol/L | HCl |
| Example 26 | LiCl_9 mol/L | 6 | 45 mol/L | HCl |
| Example 27 | LiCl_9 mol/L | 4 | 45 mol/L | HCl |
| Example 28 | LiCl_9 mol/L | 6 | 45 mol/L | HCl |
| Example 29 | LiCl_9 mol/L | 8 | 45 mol/L | LiOH |
| Example 30 | LiCl_9 mol/L | 12 | 45 mol/L | LiOH |
| Example 31 | LiCl_9 mol/L | 14 | 45 mol/L | LiOH |
| Example 32 | LiCl_9 mol/L | 8 | 45 mol/L | LiOH |
| Example 33 | LiCl_9 mol/L | 12 | 45 mol/L | LiOH |
| Example 34 | LiCl_9 mol/L | 14 | 45 mol/L | LiOH |

TABLE 6

Electrolytic Solution of Positive Electrode

| | Salt | pH | Water Concentration | pH Adjuster |
|---|---|---|---|---|
| Example 35 | LiCl_9 mol/L | 8 | 45 mol/L | LiOH |
| Example 36 | LiCl_9 mol/L | 12 | 45 mol/L | LiOH |
| Example 37 | LiCl_9 mol/L | 14 | 45 mol/L | LiOH |
| Example 38 | LiTFSI_5 mol/L | 8 | 14 mol/L | LiOH |
| Example 39 | LiTFSI_5 mol/L | 12 | 14 mol/L | LiOH |
| Example 40 | LiTFSI_5 mol/L | 14 | 14 mol/L | LiOH |
| Example 41 | LiTFSI_5 mol/L | 8 | 14 mol/L | LiOH |
| Example 42 | LiTFSI_5 mol/L | 12 | 14 mol/L | LiOH |
| Example 43 | LiTFSI_5 mol/L | 14 | 14 mol/L | LiOH |
| Example 44 | LiTFSI_5 mol/L | 8 | 14 mol/L | LiOH |
| Example 45 | LiTFSI_5 mol/L | 12 | 14 mol/L | LiOH |
| Example 46 | LiTFSI_5 mol/L | 14 | 14 mol/L | LiOH |
| Example 47 | LiCl_9 mol/L | 7 | 45 mol/L | — |
| Example 48 | LiCl_9 mol/L | 6 | 45 mol/L | HCl |
| Example 49 | LiCl_9 mol/L | 4 | 45 mol/L | HCl |
| Example 50 | LiCl_9 mol/L | 7 | 45 mol/L | — |
| Example 51 | LiCl_9 mol/L | 6 | 45 mol/L | HCl |
| Example 52 | LiCl_9 mol/L | 4 | 45 mol/L | HCl |
| Example 53 | LiCl_9 mol/L | 7 | 45 mol/L | — |
| Example 54 | LiCl_9 mol/L | 6 | 45 mol/L | HCl |
| Example 55 | LiCl_9 mol/L | 4 | 45 mol/L | HCl |
| Example 56 | LiTFSI_5 mol/L | 6.6 | 14 mol/L | — |
| Example 57 | LiTFSI_5 mol/L | 4 | 14 mol/L | HCl |
| Example 58 | LiTFSI_5 mol/L | 3 | 14 mol/L | HCl |
| Example 59 | LiTFSI_5 mol/L | 6.6 | 14 mol/L | — |
| Example 60 | LiTFSI_5 mol/L | 4 | 14 mol/L | HCl |
| Example 61 | LiTFSI_5 mol/L | 3 | 14 mol/L | HCl |
| Example 62 | LiTFSI_5 mol/L | 6.6 | 14 mol/L | — |
| Example 63 | LiTFSI_5 mol/L | 4 | 14 mol/L | HCl |
| Example 64 | LiTFSI_5 mol/L | 3 | 14 mol/L | HCl |
| Example 65 | LiCl_9 mol/L | 9 | 45 mol/L | LiOH |
| Example 66 | LiCl_9 mol/L | 13 | 45 mol/L | LiOH |
| Comparative Example 1 | LiCl_9 mol/L | 7 | 45 mol/L | — |
| Comparative Example 2 | LiCl_9 mol/L | 7 | 45 mol/L | — |

TABLE 7

| | Cycle Characteristics (times) | Discharge Capacity *In Terms of Negative Electrode Active Material Conversion | Slopes of Charge and Discharge Curves (mV) |
|---|---|---|---|
| Example 1 | 6000 | 169 mAh/g | 33 |
| Example 2 | 6000 | 169 mAh/g | 33 |
| Example 3 | 6000 | 169 mAh/g | 33 |
| Example 4 | 6000 | 169 mAh/g | 33 |
| Example 5 | 6000 | 169 mAh/g | 33 |
| Example 6 | 6000 | 169 mAh/g | 33 |
| Example 7 | 5000 | 165 mAh/g | 165 |
| Example 8 | 5000 | 165 mAh/g | 165 |
| Example 9 | 5000 | 165 mAh/g | 165 |
| Example 10 | 4000 | 153 mAh/g | 330 |
| Example 11 | 4000 | 153 mAh/g | 330 |
| Example 12 | 2000 | 145 mAh/g | 660 |
| Example 13 | 2000 | 145 mAh/g | 660 |
| Example 14 | 2000 | 145 mAh/g | 660 |
| Example 15 | 6500 | 153 mAh/g | 33 |
| Example 16 | 5300 | 145 mAh/g | 165 |
| Example 17 | 4200 | 153 mAh/g | 330 |
| Example 18 | 7000 | 169 mAh/g | 33 |
| Example 19 | 6000 | 145 mAh/g | 165 |
| Example 20 | 5000 | 153 mAh/g | 330 |
| Example 21 | 7500 | 169 mAh/g | 33 |
| Example 22 | 6500 | 165 mAh/g | 165 |
| Example 23 | 5500 | 153 mAh/g | 330 |
| Example 24 | 5500 | 169 mAh/g | 33 |
| Example 25 | 5500 | 169 mAh/g | 33 |
| Example 26 | 3500 | 153 mAh/g | 330 |
| Example 27 | 3500 | 153 mAh/g | 330 |
| Example 28 | 5500 | 169 mAh/g | 33 |
| Example 29 | 7000 | 169 mAh/g | 33 |
| Example 30 | 8000 | 169 mAh/g | 33 |
| Example 31 | 8500 | 169 mAh/g | 33 |
| Example 32 | 5000 | 153 mAh/g | 330 |

TABLE 7-continued

| | Cycle Characteristics (times) | Discharge Capacity *In Terms of Negative Electrode Active Material Conversion | Slopes of Charge and Discharge Curves (mV) |
|---|---|---|---|
| Example 33 | 6000 | 153 mAh/g | 330 |
| Example 34 | 6500 | 153 mAh/g | 330 |

TABLE 8

| | Cycle Characteristics (times) | Discharge Capacity *In Terms of Negative Electrode Active Material Conversion | Slopes of Charge and Discharge Curves (mV) |
|---|---|---|---|
| Example 35 | 7000 | 169 mAh/g | 33 |
| Example 36 | 8000 | 169 mAh/g | 33 |
| Example 37 | 8500 | 169 mAh/g | 33 |
| Example 38 | 7500 | 169 mAh/g | 33 |
| Example 39 | 8500 | 169 mAh/g | 33 |
| Example 40 | 9000 | 169 mAh/g | 33 |
| Example 41 | 5500 | 153 mAh/g | 330 |
| Example 42 | 6500 | 153 mAh/g | 330 |
| Example 43 | 7000 | 153 mAh/g | 330 |
| Example 44 | 7500 | 169 mAh/g | 33 |
| Example 45 | 8500 | 169 mAh/g | 33 |
| Example 46 | 9000 | 169 mAh/g | 33 |
| Example 47 | 7500 | 169 mAh/g | 33 |
| Example 48 | 8500 | 169 mAh/g | 33 |
| Example 49 | 9000 | 169 mAh/g | 33 |
| Example 50 | 5500 | 153 mAh/g | 330 |
| Example 51 | 6500 | 153 mAh/g | 330 |
| Example 52 | 7000 | 153 mAh/g | 330 |
| Example 53 | 7500 | 169 mAh/g | 33 |
| Example 54 | 8500 | 169 mAh/g | 33 |
| Example 55 | 9000 | 169 mAh/g | 33 |
| Example 56 | 8000 | 169 mAh/g | 33 |
| Example 57 | 9000 | 169 mAh/g | 33 |
| Example 58 | 9500 | 169 mAh/g | 33 |
| Example 59 | 6000 | 153 mAh/g | 330 |
| Example 60 | 7000 | 153 mAh/g | 330 |
| Example 61 | 7500 | 153 mAh/g | 330 |
| Example 62 | 8000 | 169 mAh/g | 33 |
| Example 63 | 9000 | 169 mAh/g | 33 |
| Example 64 | 9500 | 169 mAh/g | 33 |
| Example 65 | 6500 | 169 mAh/g | 33 |
| Example 66 | 7500 | 169 mAh/g | 33 |
| Comparative Example 1 | 1000 | 170 mAh/g | 0 |
| Comparative Example 2 | 800 | 140 mAh/g | 1000 |

Figure 12:
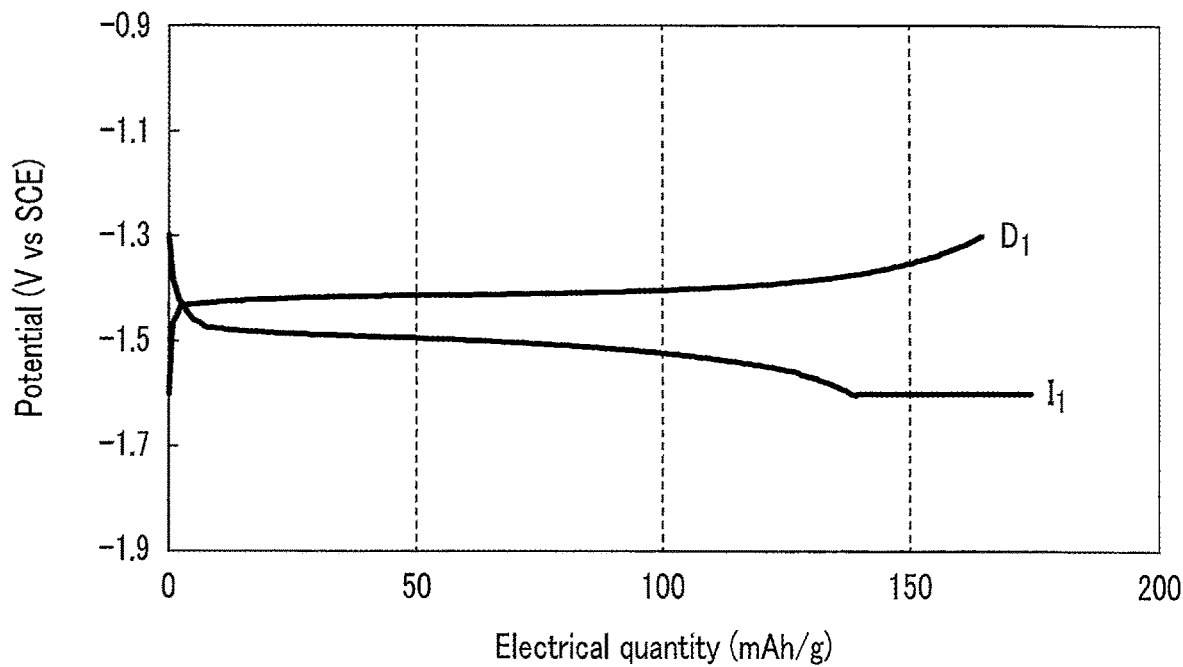
FIG. 12 is a diagram showing charge and discharge curves with respect to a reference electrode (SCE: saturated calomel electrode) of the negative electrode active material of Example 1.
Figure 13:
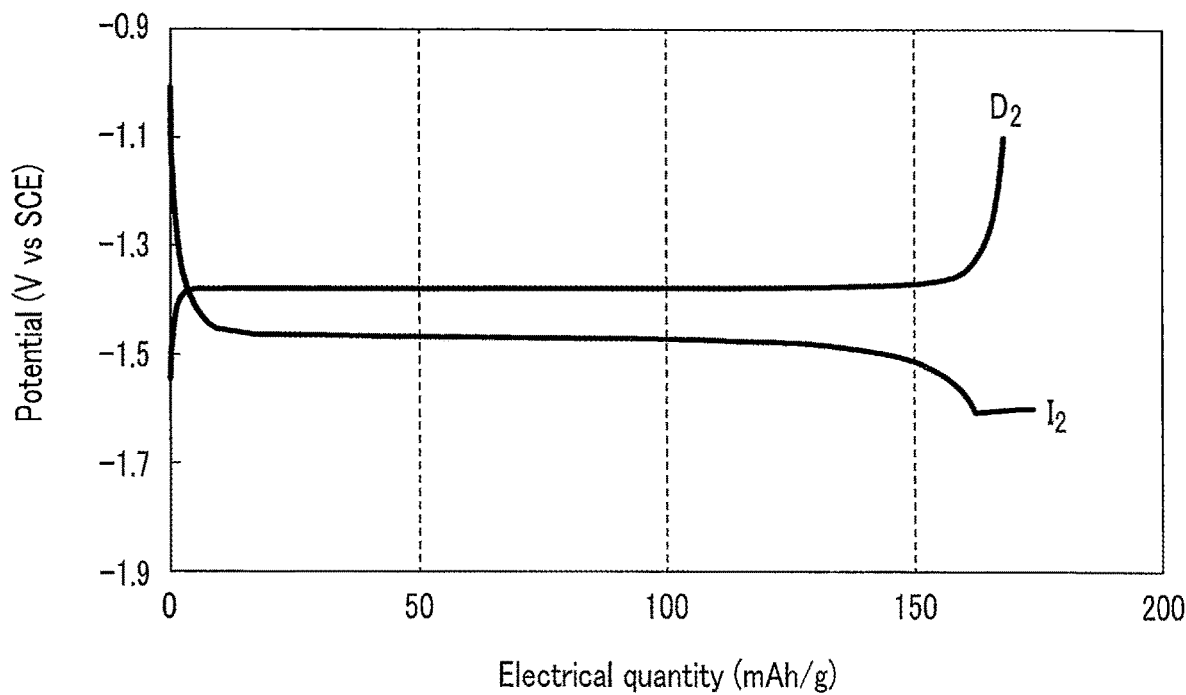
FIG. 13 is a diagram showing charge and discharge curves with respect to a reference electrode (SCE: saturated calomel electrode) of a negative electrode active material of Comparative Example 1.

As apparent from Tables 1 to 8, the cycle performance of the secondary batteries of Examples 1 to 66 demonstrated a higher degree of excellence than the cycle performance of the secondary batteries of Comparative Examples 1 and 2, and the slopes of the charge and discharge curves of the secondary batteries of Examples 1 to 66 were moderate. FIG. 12 shows the charge and discharge curves of the negative electrode active material of Example 1. The horizontal axis represents an electrical quantity (mAh/g), and the vertical axis represents a potential (V vs SCE). The curve indicated by $D_1$ is a charge reaction curve in which lithium ions are extracted from the negative electrode active material. On the other hand, the curve indicated by $I_1$ is a discharge reaction curve in which lithium ions are inserted into the negative electrode active material. FIG. 13 shows the charge and discharge curves of the negative electrode active material of Comparative Example 1. The horizontal axis represents an electrical quantity (mAh/g), and the vertical axis represents a potential (V vs SCE). The curve indicated by $D_2$ is a charge reaction curve in which lithium ions are extracted from the negative electrode active material. On the other hand, the curve indicated by $I_2$ is a discharge reaction curve in which lithium ions are inserted into the negative electrode active material.

As shown in FIG. 12, in the negative electrode active material of Example 1, the potential change curves had a moderate slope in both the charge reaction and the discharge reaction. Therefore, the SOC of the negative electrode is easily estimated from the negative electrode potential. On the other hand, in the negative electrode active material of Comparative Example 1, the potential was maintained at a constant value in both the charge reaction and the discharge reaction, as shown in FIG. 13. Therefore, the SOC of the negative electrode is difficult to estimate from the negative electrode potential.

It is understood from the comparison among Examples 1 to 14 that the secondary batteries of Examples 1 to 11 having a degree of proton substitution of 0.01 or more and less than 0.2 exhibited excellent cycle performance as compared to the secondary batteries of Examples 12 to 14 having a degree of proton substitution of 0.2. It is understood from the comparison among Examples 1 to 11 that the smaller the degree of proton substitution, the longer the cycle life becomes, and that the larger the degree of proton substitution, the larger the slopes of the charge and discharge curves become. Therefore, in order to achieve excellent cycle performance and moderate slopes of charge and discharge curves, it is preferable to set the degree of proton substitution in the range of 0.01 to 0.15.

It is understood from the comparison among Examples 24, 25, and 28 to 31, in which the degree of proton substitution was 0.01, that the larger the pH of the first and second electrolytes, the longer the cycle life becomes. It is understood that the cycle life of Examples 29 to 31, in which the pH of the first and second electrolytes was 8 or more, is longer than the cycle life of Examples 24, 25, and 28, in which the pH of the first and second electrolytes was less than 8.

In regard to the secondary batteries of Examples 47 to 66 having a structure in which the first electrolyte and the second electrolyte were separated by the separator, it is understood from the comparison between Example 47 and Example 65, in which the degree of proton substitution was 0.01, that the cycle life of Example 47, in which the pH of the second electrolyte was larger than the pH of the first electrolyte, was longer than the cycle life of Example 65, in which the pH of the second electrolyte was smaller than the pH of the first electrolyte. The same can be said from the comparison between Examples 48 and 66.

According to at least one embodiment and at least one Example described above, a negative electrode including a lithium titanium oxide having a degree of proton substitution of 0.01 to 0.2 is included. The negative electrode can suppress a proton substitution reaction that occurs when the negative electrode comes into contact with an electrolyte including water. As a result, an uneven charge-and-discharge reaction due to proton substitution can be suppressed, which allows for an enhanced discharge capacity and cycle performance of the battery. In addition, the SOC of the negative electrode can be easily estimated.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A secondary battery comprising:
   a positive electrode;
   a negative electrode comprising a lithium titanium oxide represented by $H_y(Li_{1-x}H_x)_4Ti_5O_{12}$, where $0 \leq x < 1$ and $0 < y < 0.2$;
   a first electrolyte comprising water and in contact with the positive electrode; and
   a second electrolyte comprising water and in contact with the negative electrode.

2. The secondary battery according to claim 1, wherein the second electrolyte satisfies pH >8.

3. The secondary battery according to claim 1, wherein a pH of the second electrolyte is larger than a pH of the first electrolyte.

4. The secondary battery according to claim 1, wherein a pH of the second electrolyte is 8 or more and is larger than a pH of the first electrolyte.

5. The secondary battery according to claim 1, wherein a water concentration of the first electrolyte and the second electrolyte is 0.1 mol/L or more.

6. The secondary battery according to claim 1, wherein a degree of proton substitution is from 0.01 to 0.15.

7. A battery pack comprising the secondary battery according to claim 1.

8. The battery pack according to claim 7, further comprising an external power distribution terminal and a protective circuit.

9. The battery pack according to claim 7, comprising a plurality of the secondary battery, wherein the plurality of the secondary battery are electrically connected in series, in parallel, or in a combination of in-series connection and in-parallel connection.

10. A vehicle comprising the battery pack according to claim 7.

11. The vehicle according to claim 10, comprising a mechanism configured to convert kinetic energy of the vehicle into regenerative energy.

12. A stationary power supply comprising the battery pack according to claim 7.

13. The secondary battery according to claim 1, wherein a degree of proton substitution is from 0.01 to 0.2.

14. The secondary battery according to claim 1, wherein a degree of proton substitution is from 0.01 to 0.1.

* * * * *